United States Patent
Kubota

(10) Patent No.: US 10,671,329 B2
(45) Date of Patent: Jun. 2, 2020

(54) IMAGE FORMING APPARATUS FOR GENERATING RASTER IMAGE DATA BASED ON PDL DATA, USING GENERAL PURPOSE PROCESSOR AND RASTER IMAGE PROCESSOR AND IMAGE FORMING METHOD

(71) Applicant: CANON KABUSHIKI KAISHA, Tokyo (JP)

(72) Inventor: Tomohide Kubota, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/876,983

(22) Filed: Jan. 22, 2018

(65) Prior Publication Data

US 2018/0210685 A1     Jul. 26, 2018

(30) Foreign Application Priority Data

Jan. 24, 2017     (JP) .................................. 2017-010745

(51) Int. Cl.
    *G06F 3/12*     (2006.01)
    *G03G 15/00*     (2006.01)
    (Continued)

(52) U.S. Cl.
    CPC .......... *G06F 3/1229* (2013.01); *B41J 29/393* (2013.01); *G03G 15/5087* (2013.01);
    (Continued)

(58) Field of Classification Search
None
See application file for complete search history.

(56) References Cited

U.S. PATENT DOCUMENTS

2011/0292442 A1* 12/2011 Nakagawa ............ G06F 3/1222
                                                              358/1.15
2011/0299114 A1* 12/2011 Nishimaki ............ G06F 3/1213
                                                              358/1.15

(Continued)

FOREIGN PATENT DOCUMENTS

JP     2011-248764 A     12/2011
JP     2011-257799 A     12/2011

(Continued)

*Primary Examiner* — Mohammad H Ghayour
*Assistant Examiner* — Pawan Dhingra
(74) *Attorney, Agent, or Firm* — Canon U.S.A., Inc. IP Division

(57) ABSTRACT

In an image forming system, an image processing apparatus includes a unit configured to start image generation that is based on received print data, and a unit configured to interrupt, according to receiving a notification concerning a printing instruction during execution of the image generation, the image generation and to transmit, to an image forming apparatus, generated image data and interrupted data including command information about a page whose image data is ungenerated. The image forming apparatus includes a unit configured to accept a printing instruction and to notify the image processing apparatus of the accepted printing instruction, and a unit configured to cause an image acquisition unit to acquire image data about all printing target pages using the interrupted data received from the image processing apparatus and to cause an image forming unit to perform image formation that is based on the image data about all printing target pages.

13 Claims, 16 Drawing Sheets

(51) Int. Cl.
*B41J 29/393* (2006.01)
*H04N 1/21* (2006.01)

(52) U.S. Cl.
CPC ......... *G03G 15/5091* (2013.01); *G06F 3/121* (2013.01); *G06F 3/1207* (2013.01); *G06F 3/1212* (2013.01); *G06F 3/1247* (2013.01); *G06F 3/1288* (2013.01); *H04N 1/21* (2013.01); *G06F 3/122* (2013.01); *G06F 3/1238* (2013.01); *G06F 2206/1514* (2013.01)

(56) References Cited

U.S. PATENT DOCUMENTS

| | | | | |
|---|---|---|---|---|
| 2013/0120794 | A1* | 5/2013 | Kamoi | G06K 15/02 358/1.15 |
| 2015/0138604 | A1* | 5/2015 | Fujisawa | G06F 3/1285 358/2.1 |

FOREIGN PATENT DOCUMENTS

| | | | |
|---|---|---|---|
| JP | 2013-103477 A | 5/2013 |
| JP | 2015-099475 A | 5/2015 |

\* cited by examiner

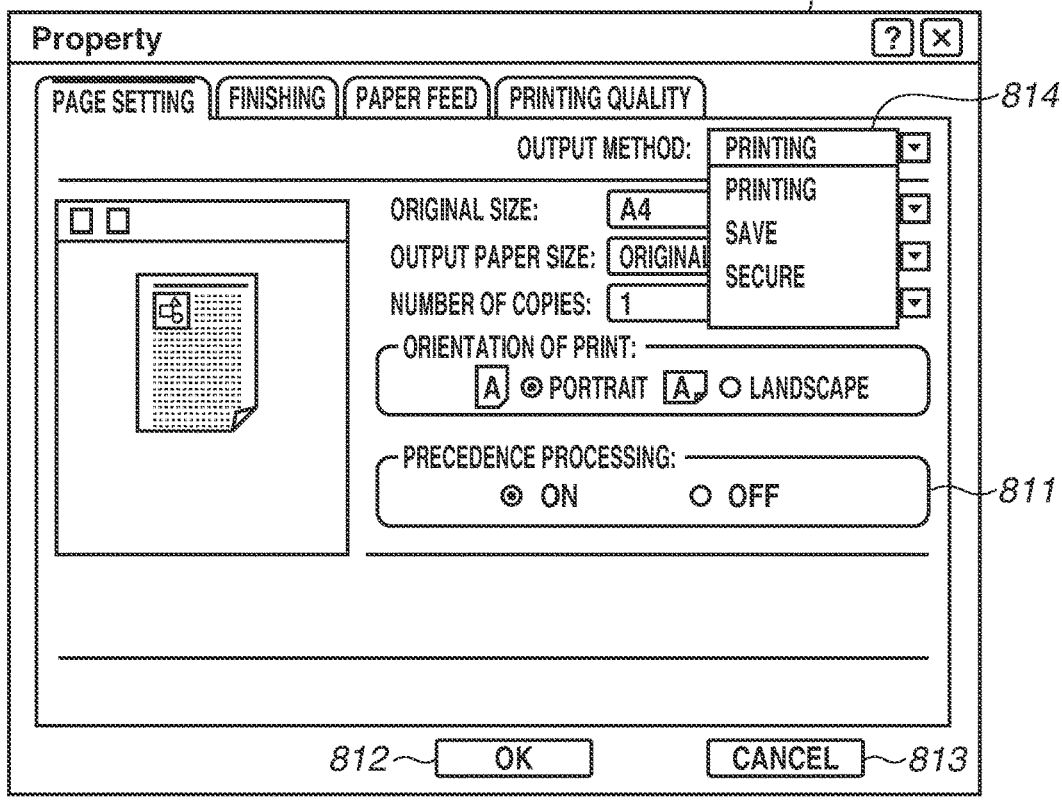

FIG.10

| APPARATUS ID | APPARATUS TYPE | ADDRESS | COLOR/ MONOCHROME | OUTPUT SIZE | RESOLUTION | RIP CAPABILITY | ENGINE SPEED | TRANSFER SPEED | STATUS |
|---|---|---|---|---|---|---|---|---|---|
| 101 | PRINTING APPARATUS | aaa.bbb.ccc.ddd | COLOR | A4 | 300 × 300 dpi | HIGH | 50 SHEETS PER MINUTE | 1024 kilobytes PER SECOND | ONLINE |
| 102 | PRINTING APPARATUS | ppp.qqq.rrr.sss | COLOR | A3 | 600 × 600 dpi | MEDIUM | 40 SHEETS PER MINUTE | 1024 kilobytes PER SECOND | ONLINE |
| 103 | PRINTING APPARATUS | iii.jjj.kkk.lll | MONOCHROME | A4 | 300 × 300 dpi | LOW | 35 SHEETS PER MINUTE | 1024 kilobytes PER SECOND | ONLINE |

USAGE OF SAVED FILES

SELECT A FILE AND SPECIFY USE PURPOSE.

BOX /00:

| ✓ | TYPE | NAME ▲ | PAPER SIZE | PAGE | DATE/TIME ▲ |
|---|---|---|---|---|---|
| 1↓ | 📄 | 20131021115312 | A4 | 1 | 10/21 11:53 |
| 2↓ | 📄 | 20131021115433 | A4 | 1 | 10/21 11:54 |

*1111*

1/1

UP | UPDATE | TOTAL: 2 | NUMBER OF SELECTED FILES: 2

CANCEL SELECTION | TEST PRINT

DETAILED INFORMATION ▸ | IMAGE DISPLAY ▸ | FILE EDITING ▸ | TRANSMIT | PRINT ▸

HOLD PRINTING

| DOCUMENT NAME | ENTRY TIME | PRECEDENCE PROCESSING | PREDICTED PROCESSING TIME |
|---|---|---|---|
| material 1.doc | 18:05 | PROCESSED | 1 MINUTE |
| material 2.doc | 18:06 | PROCESSING IN PROGRESS | 1 TO 2 MINUTES |
| material 3.doc | 18:07 | UNPROCESSED | 2 MINUTES |

*1121*

LOGIN/USER A | PRINT SETTING | START PRINTING

*1123*  *1122*

IMAGE FORMING APPARATUS FOR GENERATING RASTER IMAGE DATA BASED ON PDL DATA, USING GENERAL PURPOSE PROCESSOR AND RASTER IMAGE PROCESSOR AND IMAGE FORMING METHOD

BACKGROUND OF THE INVENTION

Field of the Invention

Aspects of the present invention generally relate to an image forming system which forms an image on a sheet. The image forming system includes an image forming apparatus, which forms an image on a sheet, and an image processing apparatus, which is capable of communicating with the image forming apparatus. The image forming apparatus is used as, for example, a copying machine, a printer, a facsimile apparatus, and a multifunction peripheral, which includes a plurality of their functions.

Description of the Related Art

Along with the recent spread of network environments, with regard to an image forming system using an image forming apparatus, such as a printer, it has become general to manage print data with a server (an image processing apparatus). Japanese Patent Application Laid-Open No. 2011-257799 discusses an image forming system in which a server having received print data from a personal computer (PC) transmits the print data to a printer. The server discussed in Japanese Patent Application Laid-Open No. 2011-257799 is able to perform either of processing for rendering entire page-description language (PDL) data into image data and then transmitting the image data and processing for transmitting original PDL data without performing rendering thereon, according to a transmission request received from the printer.

Moreover, the server discussed in Japanese Patent Application Laid-Open No. 2011-257799 determines whether to render print data, after receiving a request for a saved job from the printer. Therefore, during a period in which the server is performing rendering, a waiting time would occur for the user.

Therefore, there can be considered a method in which the server renders print data beforehand before receiving a printing request. However, in a case where this method is employed, the following issue arises. It is such an issue that, in a case where a request for print data is received from the printer while the server is performing rendering beforehand, prevention or reduction of a waiting time cannot be effectively performed.

For example, when a request for print data is received from a printer having a high raster image processor (RIP) capability, rendering is interrupted and original PDL data is transmitted for the reason that the RIP capability of a transmission destination is high. Then, the PDL data has to be rendered by the printer from the first, so that a waiting time would occur.

Furthermore, when a request for print data is received from a printer having a high RIP capability, if print data is transmitted to the printer after rendering is completed for the reason that rendering has progressed partway, the high RIP capability of the printer cannot be utilized, so that a waiting time would occur.

SUMMARY OF THE INVENTION

Aspects of the present invention are generally directed to providing an image processing apparatus which is capable of preventing or reducing the occurrence of a waiting time in an image forming apparatus even in a case where a request for print data is received during a period in which rendering of the print data is being performed beforehand.

According to embodiments of the present invention, an image forming system includes an image forming apparatus which includes an image acquisition unit configured to acquire image data about all printing target pages of a plurality of pages included in print data and an image forming unit configured to form an image on a sheet, which, after receiving print data having user information appended thereto, accepts an instruction of an authenticated user corresponding to the user information, and causes the image forming unit to perform image formation that is based on image data about a printing target page, and an image processing apparatus which processes print data, the image forming apparatus and the image processing apparatus being connected to each other in such a way as to communicate with each other, in which the image processing apparatus includes a first controller configured of at least one processor or at least one circuit having a function, the first controller configured to function as a unit configured to start, according to receiving print data from an external apparatus, image generation that is based on the received print data, and a unit configured to interrupt, according to receiving a notification concerning a printing instruction for the print data during execution of the image generation from the image forming apparatus, the image generation and to transmit, to the image forming apparatus, image data generated and acquired by the image processing apparatus and interrupted data including command information about a page whose image data is ungenerated, and the image forming apparatus includes a second controller configured of at least one processor or at least one circuit having a function, the second controller configured to function as a unit configured to accept a printing instruction for print data from an authenticated user and to notify the image processing apparatus of the accepted printing instruction, and a unit configured to cause the image acquisition unit to acquire image data about all printing target pages using the interrupted data received from the image processing apparatus and to cause the image forming unit to perform image formation that is based on the image data about all printing target pages.

Further features of the present invention will become apparent from the following description of exemplary embodiments with reference to the attached drawings.

BRIEF DESCRIPTION OF THE DRAWINGS

FIGS. 8A and 8B illustrate a printer driver screen and a print data structure, respectively.

FIG. 10 illustrates an apparatus information database (DB).

FIGS. 11A and 11B illustrate a usage screen for save data and a usage screen for held data, respectively.

DESCRIPTION OF THE EMBODIMENTS

Various exemplary embodiments, features, and aspects of the invention will be described in detail below with reference to the drawings. In the following exemplary embodiments, a printing system (image forming system) which performs print processing on a sheet (recording material or paper) by forming an image based on print data is described. Furthermore, the aspects of the invention are not limited to configurations described in the exemplary embodiments. Part or all of the configurations of the exemplary embodiments can be replaced by equivalents as long as advantageous effects of the invention are brought about.

In a first exemplary embodiment, a printing system which temporarily accumulates print data transmitted from a personal computer (PC) in a server and downloads the print data from the server to a printer to perform printing is described.

[Printing System]

The printing system 1 includes a server 105, printing apparatuses (image forming apparatuses) 101, 102, and 103, and a PC (host computer) 104. Such apparatuses are interconnected via a local area network (LAN) 5, such as Ethernet, in such a way as to be able to communicate with each other.

In the printing system 1, print data (a print job) output from the PC 104 is temporarily accumulated in the server 105 and is then downloaded from the server 105 to the printing apparatus 101, 102, or 103. The printing apparatus having received print data performs image formation based on the print data.

Figure 1:
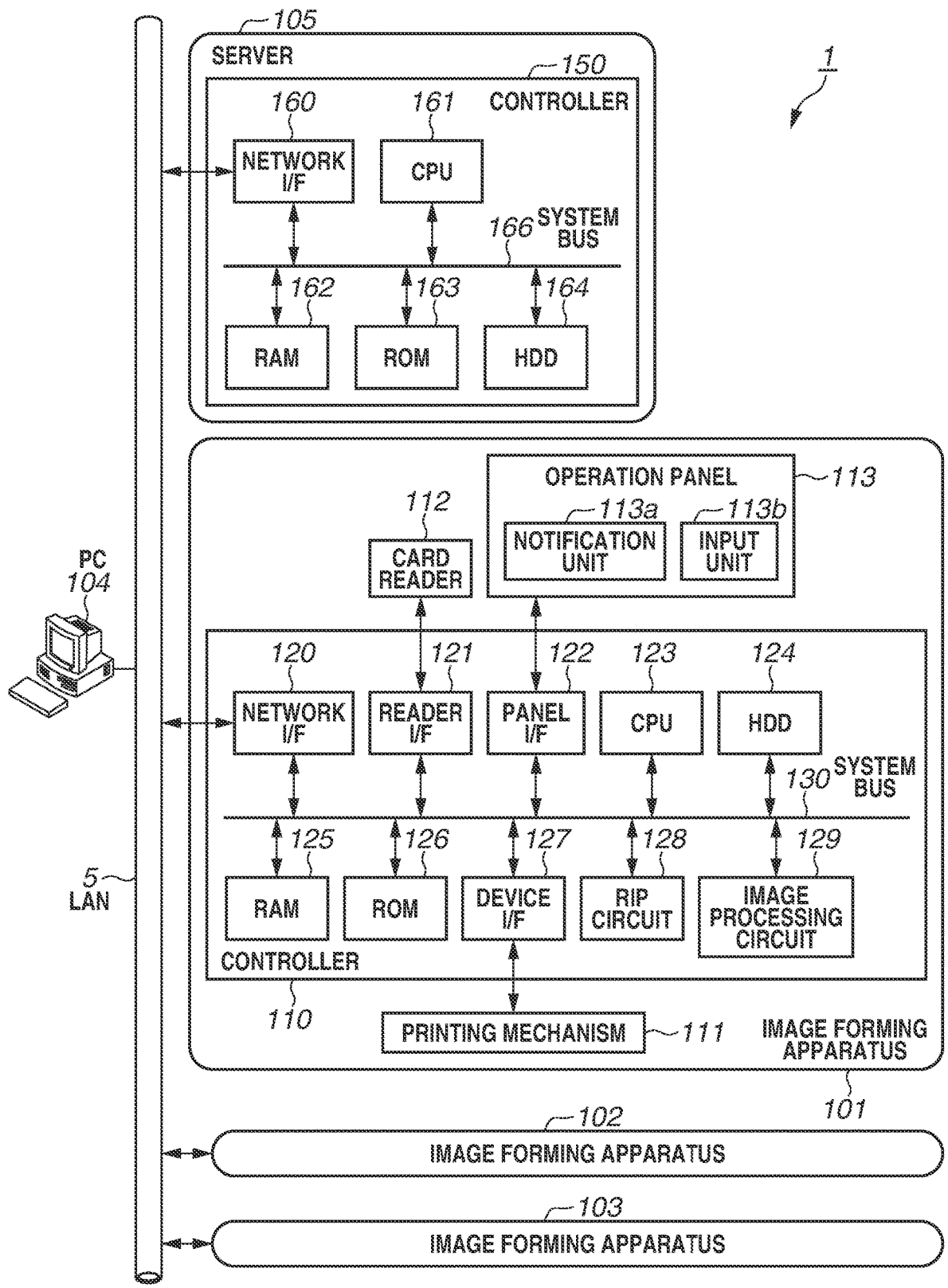
FIG. 1 illustrates an image forming system.

Next, a configuration of each apparatus is described with reference to FIG. 1. FIG. 1 illustrates an image forming system.

The PC 104 is a general computer which functions as an external apparatus with respect to printing apparatuses. The PC 104 includes a controller (not illustrated), which includes, for example, a read-only memory (ROM), a random access memory (RAM), and a central processing unit (CPU), and performs information processing that is based on a program. The description of a specific configuration of the PC 104 is omitted. The PC 104 becomes able to be used by the user logging in to an operating system (OS). The PC 104 executes a printer driver to generate print data of the page-description language (PDL) data format based on document data (document). PDL data is data described with a page-description language (PDL), and is data each piece of page information of which is able to be interpreted by the printing apparatuses 101, 102, and 103 and the server 105.

The server 105 is an information processing apparatus (image processing apparatus) which performs information management of print data. Details of the server 105 are described below. The server 105 stores and manages print data transmitted from the PC 104. Moreover, the server 105 transmits print data in response to a request from the printing apparatus 101, 102, or 103.

The printing apparatus 101, 102, or 103 is an apparatus which performs printing on a sheet (recording material or paper) based on print data. The printing apparatus 101, 102, or 103 is able to request print data from the server 105. Moreover, the printing apparatus 101, 102, or 103 is able to receive print data transmitted from the PC 104. In the present exemplary embodiment, a case in which print data is acquired from the server 105 is described. Furthermore, the printing apparatus 101, 102, or 103 can be a multifunction peripheral or multifunction printer (MFP) or a single function printer (SFP).

[Image Forming Sequence]

Figure 3:
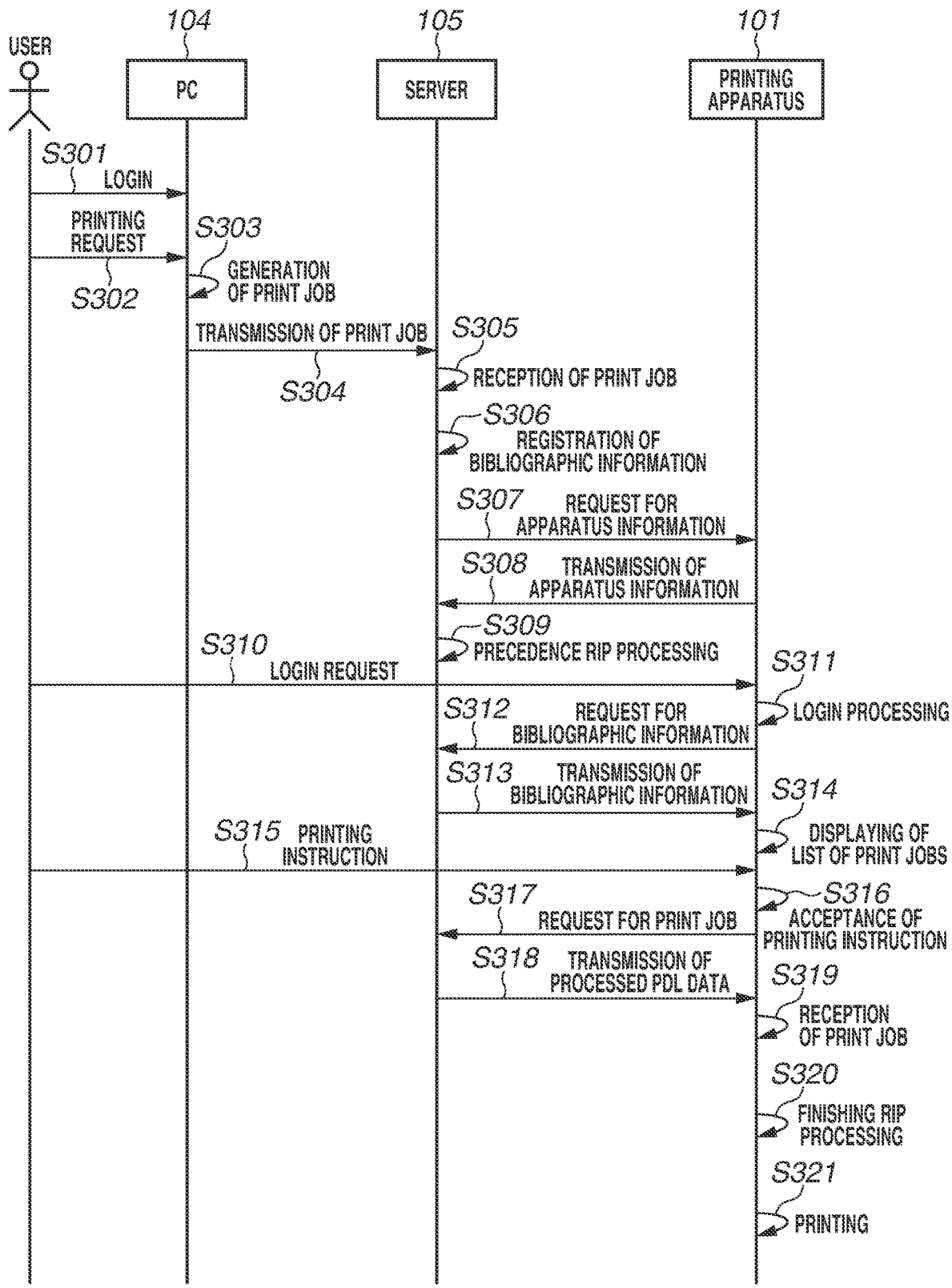
FIG. 3 is a diagram illustrating a processing sequence of the image forming system.

An overall sequence in a case where printing is performed with use of the printing system 1 is described. FIG. 3 illustrates a processing sequence of the image forming system. In the present exemplary embodiment, a case in which the server 105 stores print data transmitted from the PC 104 and the user causes the printing apparatus 101 to print the stored print data is described. The server 105 has the function to previously perform analysis and conversion processing on the received print data before receiving a request for print data from the printing apparatus 101, 102, or 103. This processing is referred to as "precedence raster image processor (RIP) processing". Details of the precedence RIP processing are described below.

To start the image forming sequence, first, in step S301, the user makes a login request to the PC 104. In the login request, the user performs entry of user information, such as a user account name, and authentication information, such as a password. The PC 104 performs login processing for the user based on the information entered by the user. The logged-in user designates a document to be printed and issues an instruction to execute a printer driver. When the printer driver is activated, in step S302, after designating a transmission destination of print data and a print setting, the user issues a printing instruction. In the present exemplary embodiment, the user designates the server 105 as the transmission destination of print data. In step S303, the PC 104 generates print data based on, for example, the designated document, the print setting, and user information about the logged-in user. The generated print data has a structure such as that illustrated in FIG. 8B. Upon generation of the print data, in step S304, the PC 104 transmits the print data to the server 105. In step S305, upon receiving the print data, the server 105 performs reception processing on the print data. In step S306, the server 105, which has received the print data, registers bibliographic information about the received print data with a bibliographic information database (DB). Upon completion of registration of the bibliographic information, in step S307, prior to performing precedence RIP processing, the server 105 requests apparatus information from each printing apparatus connected to the server 105. The apparatus information is, for example, specification information or status information about each apparatus. Upon acquiring the apparatus information, in step S308, the server 105 registers the acquired apparatus information with an apparatus information database (DB) such as that illustrated in FIG. 10. FIG. 10 illustrates the apparatus information DB. Then, in step S309, the server 105 performs precedence RIP processing on the print data received in step S305.

After that, in step S310, the user makes a login request to any one of the printing apparatuses 101, 102, and 103. Here, a case in which login is performed to the printing apparatus 101 is described. Upon receiving the login request from the user, in step S311, the printing apparatus 101 performs login processing in response to the login request. When login is successful, in step S312, the printing apparatus 101 requests bibliographic information associated with the logged-in user from the server 105. Upon receiving the request, in step S313, the server 105 transmits the bibliographic information. In step S314, the printing apparatus 101 having received the bibliographic information from the server 105 displays a list of jobs for the logged-in user. In step S315, the user, who has checked the displayed print data list, selects print data to be printed and issues a printing instruction. In step S316, the printing apparatus 101 accepts the printing instruction, and, in step S317, transmits a transmission request for the print data to the server 105. In step S318, the server 105, which has accepted the transmission request, transmits PDL data obtained by performing precedence RIP processing in step S309 to the printing apparatus 101. Upon receiving the print data, in step S319, the printing apparatus 101 performs reception processing on the print data. Then, in step S320, the printing apparatus 101 performs finishing RIP processing on the print data subjected to the precedence RIP processing. Then, in step S321, the printing apparatus 101 performs printing based on the image data generated by the finishing RIP processing.

[Printer Driver]

As mentioned above, a printer driver is used for the PC 104 to transmit print data. An operation screen for the printer driver is configured, for example, as illustrated in FIG. 8A. FIG. 8A illustrates a setting screen for printing in the printer driver. The setting screen 810 is able to be invoked after a document to be printed and an output destination are designated. The setting screen 810 allows designating various print settings. Examples of settable items include an output method 814, the size of original, the size of output paper, the number of copies, the orientation of print, and precedence processing setting 811.

The output method 814 allows setting one of printing, save, and secure. The output method "printing" is setting for allowing immediately performing printing with respect to an output destination for print data. The output method "save" is setting for causing an output destination to save print data (or image data that is based on print data) to a designated folder (directory). The output method "secure (hold printing)" is setting for designating save of print data to an output destination for print data. Moreover, the output method "secure" allows setting a password. When a password is set, the output destination is allowed to perform printing after authentication of the password.

The precedence processing setting 811 allows setting ON/OFF of the precedence processing function. When an OK button 812 is selected after print setting, the print setting is reflected, and, when a cancel button 813 is selected, the setting is ended without the print setting being reflected. After that, when a transmission instruction is issued via a print data transmission screen (not illustrated), print data is transmitted to the designated output destination. In the present exemplary embodiment, print data is transmitted to the server 105.

Print data which the PC 104 transmits to the server 105 has a structure illustrated in FIG. 8B. FIG. 8B illustrates a print data structure. Print data 820 includes a header section 821 and a PDL section 822. User information and print setting information are stored in the header section 821. Drawing commands configuring each page, such as P1, Line1, and Text1, are stored in the PDL section 822. P1, which is included in the first page of print data, represents a drawing range [A, B] of the entire page. Line1 represents a straight line segment connecting coordinates (x1, y1) and coordinates (x'1, y'1). Text1 represents drawing a character string of "abc" with a character size (size=12) from coordinates (x2, y2). Rect1, which is a command for drawing a rectangle, represents a rectangle including upper left corner coordinates (x3, y3) and lower right corner coordinates (x'3, y'3). Image1 represents drawing a graphic image with coordinates (x4, y4) set as an origin. In this way, each page of the PDL section is configured with a plurality of PDL commands. Furthermore, while, in the present exemplary embodiment, a user name is used as information for identifying the user, for example, a user identifier (ID) can be used.

[Mechanical Configuration of Server]

As illustrated in FIG. 1, the server 105 includes a controller 150. The controller 150 is a control unit which comprehensively controls the entirety of the server 105 based on a program. The controller 150 includes a network interface (I/F) 160, a CPU 161, a hard disk drive (HDD) 164, a RAM 162, and a ROM 163. These components included in the controller 150 are interconnected by a system bus 166 in such a way as to communicate with each other. Furthermore, the controller 150 can be configured with a single circuit substrate (board) or can be configured with a plurality of circuit substrates (boards).

The network I/F 160 is a communication interface used for inputting and outputting information with respect to an external apparatus via the LAN 5. The network I/F 160 to be used includes, for example, a LAN card compliant with Transmission Control Protocol/Internet Protocol (TCP/IP).

The CPU 161 is a central computational processing unit (processor) which performs computational operations for various control operations. The HDD 164 is a storage unit used to store system software and various pieces of data, such as print data and image data. The HDD 164 is able to store PDL data.

The RAM 162 is a system work memory which is used as a work area for the CPU 161. Moreover, the RAM 162 functions as an image memory used to temporarily store print data or image data.

The ROM 163 is a memory in which various programs including a boot program of the system are stored.

[Software Configuration of Server]

Figure 2A:
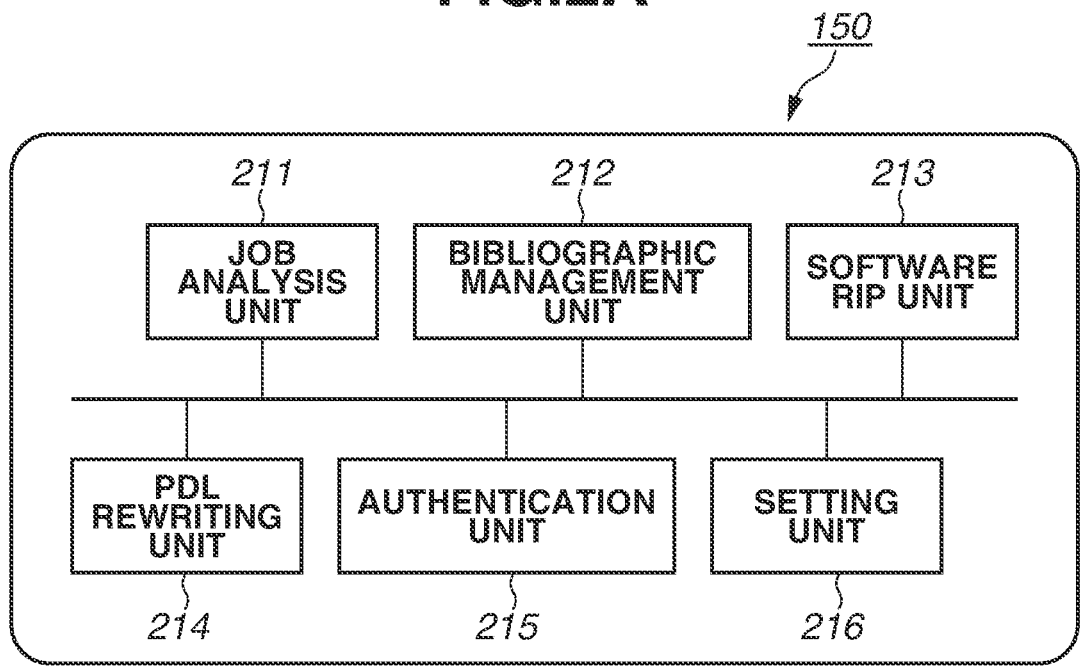
FIGS. 2A and 2B are a block diagram illustrating a software configuration of a server and a block diagram illustrating a software configuration of an image forming apparatus, respectively.

The controller 150 functions as various functional units by executing various programs. To be more specific, various functions are implemented by the programs stored in the ROM 163 or the HDD 164 being loaded onto the RAM 162 and being executed by the CPU 161. FIG. 2A illustrates functional blocks of the controller 150. As illustrated in FIG. 2A, the controller 150 includes, as functional units, a job analysis unit 211, a bibliographic management unit 212, a software RIP unit 213, a PDL rewriting unit 214, an authentication unit 215, and a setting unit 216. Furthermore, a configuration in which a part or the whole of program processing for implementing various functional units is executed by an external apparatus connected to the server 105, what is called a cloud configuration, can also be employed.

The job analysis unit 211 is a functional unit for analyzing received print data and acquiring information. The job analysis unit 211 acquires a user name, a document name, and print setting information from the header section 821 of print data, as information for generating bibliographic information for one record.

Furthermore, the job analysis unit 211 acquires prediction information about a time required for rendering by analyzing the PDL section 822. Time prediction is performed based on, for example, the size of print data and the number and types of PDL commands included in print data. Information acquired by the job analysis unit 211 is stored in a bibliographic information database (DB) in association with print data.

The bibliographic management unit 212 is a functional unit which manages information concerning print data with the bibliographic information DB. Information to be registered with the bibliographic information DB is acquired by the job analysis unit 211. In the bibliographic information DB, for example, a job ID, a user name (user information), a file name (document name), print setting, entry time, and analysis status are stored in association with one piece of print data.

The software RIP unit 213 is a functional unit which generates image data by interpreting a PDL command. The software RIP unit 213 is implemented by a program and is, therefore, able to perform flexible processing as compared with an RIP circuit 128, which is a dedicated circuit. For example, the software RIP unit 213 is able to perform rendering (generation processing of an image) on not all of the pages but only a specific page. Moreover, the software RIP unit 213 is able to interrupt rendering and store a halfway result of processing.

The PDL rewriting unit 214 is a functional unit for performing rewriting of a command described in PDL data. The PDL rewriting unit 214 functions as a PDL generation unit which generates processed PDL data.

The authentication unit 215 is a functional unit used for an administrator user to log in to the server 105. A dedicated operation terminal (not illustrated) or the PC 104 can be used to log in to the server 105. The administrator user logging in to the server 105 is able to change various settings of the server 105.

The setting unit 216 is a functional unit which manages the various settings of the server 105. Setting information can be changed from prescribed values by the operation of the administrator user. When changing of a setting is performed, a management flag (setting value) corresponding to the content of the setting is rewritten. In the present exemplary embodiment, for example, ON/OFF setting of forced precedence RIP, setting of a method of interrupting precedence RIP, and setting of a method of determining interruption processing can be performed. Operation modes of the controller 150 are switched by changing of a setting.

[Configuration of Printing Apparatus]

A configuration of the printing apparatus for implementing the above-described image forming sequence is described. Furthermore, since the configurations of the printing apparatuses 101, 102, and 103 are similar, only the configuration of the printing apparatus 101 is described as a representative, and those of the printing apparatuses 102 and 103 are omitted from description.

[Mechanical Configuration of Printing Apparatus]

As illustrated in FIG. 1, the printing apparatus 101 includes a controller 110 (control unit), a printing mechanism 111 (printing unit or image forming unit), a card reader 112 (authentication unit), and an operation panel 113 (operation unit or display unit).

The printing mechanism 111 is a mechanism for forming an image on a sheet. The printing mechanism 111 functions as an image forming unit. For example, an electrophotographic-type mechanism or an inkjet-type mechanism can be used as the printing mechanism 111.

The card reader 112 is a unit which reads authentication information for user authentication from a storage medium, such as an integrated circuit (IC) card, which the user has. Furthermore, as long as it is able to acquire authentication information, another device, such as a fingerprint reader, can be used instead of the card reader 112. After reading authentication information from the card, the card reader 112 outputs the read authentication information to the controller 110.

The operation panel 113 (operation unit) is an acceptance unit or a user interface which transmits information to the user and accepts an instruction from the user. The operation panel 113 includes an input unit 113b (operation unit) used for the user to perform inputting, such as input keys or a touch screen, and a notification unit 113a (display unit or annunciation unit) for notifying the user of information with light or sound, such as a liquid crystal panel or a loudspeaker. The operation panel 113 outputs input information from the user to the controller 110 and receives notification information to the user from the controller 110.

The controller 110 is a control unit which comprehensively controls the entirety of the printing apparatus 101 based on a program. The controller 110 includes a network I/F 120, a reader I/F 121, a panel I/F 122, a CPU 123, an HDD 124, a RAM 125, a ROM 126, a device I/F 127, a raster image processor (RIP) circuit 128, and an image processing circuit 129. These components included in the controller 110 are interconnected by a system bus 130 in such a way as to communicate with each other. Furthermore, the controller 110 can be configured with a single circuit substrate (board) or can be configured with a plurality of circuit substrates (boards).

The network I/F 120 is a communication interface used for inputting and outputting information with respect to an external apparatus via the LAN 5. The network I/F 120 to be used includes, for example, a LAN card compliant with TCP/IP.

The reader I/F 121 is an interface for inputting and outputting information with respect to the card reader 112.

The panel I/F 122 is an interface for inputting and outputting information with respect to the operation panel 113.

The CPU 123 is a central computational processing unit (processor) which performs computational operations for various control operations. The HDD 124 is a storage unit used to store system software and various pieces of data, such as print data and image data. The HDD 124 is able to store PDL data.

The RAM 125 is a system work memory which is used as a work area for the CPU 123. Moreover, the RAM 125 functions as an image memory used to temporarily store print data or image data.

The ROM 126 is a memory in which various programs including a boot program of the system are stored.

The device I/F 127 is an interface for inputting and outputting information with respect to the printing mechanism 111. The device I/F 127 performs synchronous or asynchronous conversion when image data is communicated between the printing mechanism 111 and the controller 110.

The RIP circuit 128 is a unit which analyzes a drawing command (PDL command) or intermediate data (display list) included in print data and rasterizes the drawing command or intermediate data into an image. Thus, the RIP circuit 128 performs generation processing of an image. A dedicated circuit (hardware) which generates an image based on input print data can be used as the RIP circuit 128. Using a dedicated circuit which consistently processes pages from the top page to the end page in the order of page enables generating an image at high speed. In the present exemplary embodiment, the RIP circuit 128 is more excellent in rendering efficiency than the software RIP unit 213. In other words, the RIP circuit 128 is faster in rendering speed than the software RIP unit 213. In the present exemplary embodiment, the rendering speed of the RIP circuit 128 is twice the rendering speed of the software RIP unit 213.

In the printing system 1, the software RIP unit 213 is used as a first image generation unit. In the printing system 1, the RIP circuit 128 is used as a second image generation unit.

The image processing circuit 129 acquires image data generated by the RIP circuit 128, and performs processing, such as correction and resolution conversion, on the image data based on the apparatus information about the printing mechanism 111. The corrected and converted image data is transmitted to the printing mechanism 111 via the device I/F 127.

[Software Configuration of Printing Apparatus]

Figure 2B:
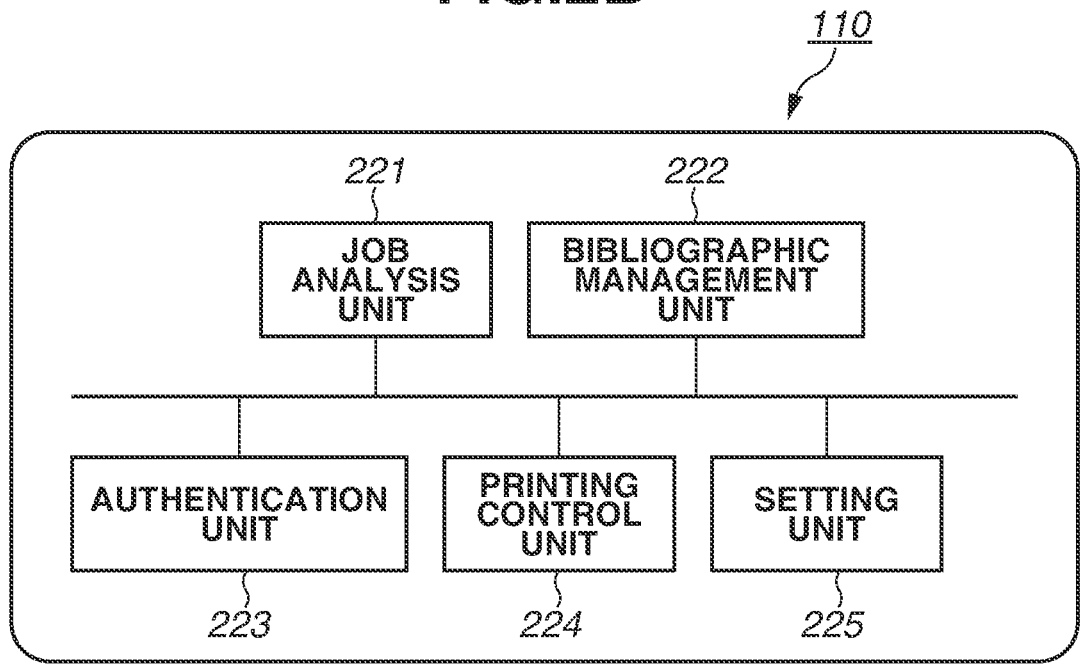

The controller 110 functions as various functional units by executing various programs. To be more specific, various functions are implemented by the programs stored in the ROM 126 or the HDD 124 being loaded onto the RAM 125 and being executed by the CPU 123. FIG. 2B illustrates functional blocks of the controller 110. As illustrated in FIG. 2B, the controller 110 includes, as functional units, a job analysis unit 221, a bibliographic management unit 222, an authentication unit 223, a printing control unit 224, and a setting unit 225. Furthermore, a configuration in which a part or the whole of program processing for implementing various functional units is executed by an external apparatus connected to the printing apparatus 101, what is called a cloud configuration, can also be employed.

The job analysis unit 221 is a functional unit for analyzing received print data and acquiring information.

The bibliographic management unit 222 is a functional unit which manages information concerning print data with a bibliographic information DB. Information to be registered with the bibliographic information DB is acquired from the server 105 at the time of the user's login.

The authentication unit 223 is a functional unit for performing login processing for the user who operates the printing apparatus 101. The login processing is performed to check matching between information included in the user database (DB) previously stored in the HDD 124 and the user information input by the user. If the user information is matching, the authentication unit 223 allows the logged-in user to operate the printing apparatus 101 within the limit of authority registered with the user DB. Furthermore, the user information is input from the card reader 112 in the case of using card authentication and is input from the operation panel 113 in the case of using keyboard authentication (password authentication).

The printing control unit 224 is a functional unit for controlling the printing mechanism 111. The printing control unit 224 controls the printing mechanism 111 based on the setting information about the printing apparatus 101 and the print setting.

The setting unit 225 is a functional unit which manages various settings of the printing apparatus 101. Inputting of the setting information is assumed to be previously performed by, for example, the administrator user. The setting information can be changed by the administrator via the input unit 113*b*. When changing of the setting is performed, a management flag (setting value) corresponding to the content of the setting is rewritten.

[Printing Instruction Screen]

The printing apparatus 101, which performs printing based on a printing instruction received from the user, has a plurality of functions related to printing. The user operates the operation panel 113 to use the various functions of the printing apparatus 101.

One of the plurality of functions includes a box function. The box function is a function to manage print data or image data in units of a folder (directory). The Box function enables saving print data transmitted from the PC 104 and designated as a target for "save" and image data read from an original via a scanner (not illustrated). FIG. 11A illustrates a usage screen for saved data.

To use the box function, the user operates the operation panel 113 to display a box screen 1110. The box screen 1110 can be used to designate the use of a file saved in the printing apparatus 101. The box screen 1110 includes a job list 1111 and a printing instruction button 1112. The job list 1111 is a list of jobs saved in a designated box. In FIG. 11A, a list of jobs saved in the box "/00:" is displayed. The printing instruction button 1112 is a button used to issue an instruction for executing printing of a job selected from the job list. Furthermore, the box screen 1110 can be used to issue, besides the printing instruction, an instruction for sensing a job via e-mail or an instruction for displaying a preview image.

One of the plurality of functions includes a hold printing function. The hold printing function is a function to use print data held in the server 105 for printing. FIG. 11B illustrates a usage screen for held data.

To use the hold printing function, the user operates the operation panel 113 to display a hold printing screen 1120. The hold printing screen 1120 can be used to issue an instruction for using a file saved in the server 105. The hold printing screen 1120 includes a job list 1121, a printing instruction button 1122, and a print setting button 1123. The job list 1121 is a list of jobs saved in the server 105. Here, only jobs associated with the user A who is logged in are displayed. The printing instruction button 1122 is a button used to issue an instruction for executing printing of a job selected from the job list. The print setting button 1123 is a button used to issue an instruction for changing a print setting of a job selected from the job list.

In the list 1121, besides the document name and entry time of print data, a precedence processing state and a predicted processing time are displayed. The precedence processing state indicates the state of print data in the server 105. An indication "processed" indicates that the print data has been subjected to precedence RIP. An indication "processing in progress" indicates that the print data is in the process of being subjected to precedence RIP. An indication "unprocessed" indicates that precedence RIP of the print data has not yet been performed. The predicted processing time indicates a predicted time from when printing is started until printing is completed. In a job "material 1.doc", in which the precedence processing state is "processed", the predicted processing time is one minute, which is relatively short. In a job "material 3.doc", in which the precedence processing state is "unprocessed", the predicted processing time is two minutes, which is relatively long. In a job "material 2.doc", in which the precedence processing state is "processing in progress", the processing time is not yet specified, so that the predicted processing time is specified in the range of one to two minutes based on a predicted time obtained before precedence RIP and a predicted time obtained after precedence RIP.

[Control Processing in Server]

With regard to a major process to be performed by the server 105 among various processes illustrated in the image forming sequence, the processing content thereof is described in detail. Each processing operation is performed by the controller 150 (specifically, by the CPU 161).

[Job Reception Processing]

Figure 4:
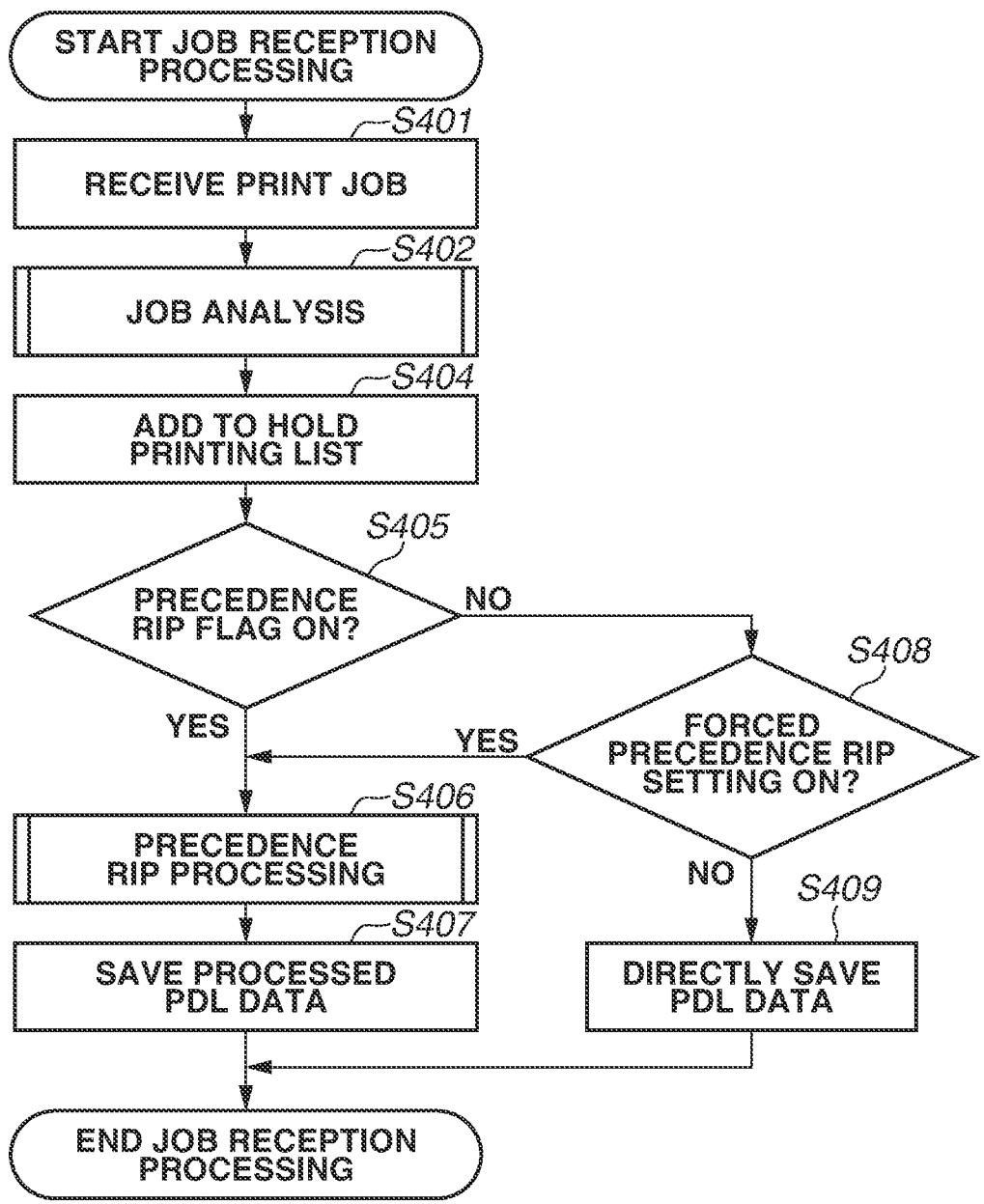
FIG. 4 is a flowchart of job reception processing.

The server 105 performs job reception processing in response to reception of print data performed in step S305. The following describes the flow of job reception processing in detail. FIG. 4 is a flowchart illustrating the job reception processing.

In step S401, when print data is transmitted from the PC 104 via a network, such as the LAN 5, the controller 150 receives the print data via the network I/F 160. Upon receiving the print data, in step S402, the controller 150 analysis the print data, which is of the PDL format, by using the job analysis unit 211.

In step S404, the controller 150, which functions as the bibliographic management unit 212, associates, for example, a document name, user information, and a storage address of the print data with one another, and registers the associated pieces of information, as bibliographic information about a print job, with a bibliographic information DB. At this stage, the thus stored bibliographic information and the print data are ready to be transmitted to any one of the printing apparatuses 101, 102, and 103.

Upon registration of the print job with the bibliographic information DB, in step S405, the controller 150 determines whether a precedence RIP flag appended to the print data is ON or OFF. If it is determined that the precedence RIP flag is ON (YES in step S405), then in step S406, the controller 150, which functions as the software RIP unit 213, performs precedence RIP processing on the print data. Details of the precedence RIP processing are described below. In step S407, the controller 150 stores the processed PDL data obtained as a result of the precedence RIP processing in the HDD 164.

If it is determined that the precedence RIP flag is OFF (NO in step S405), then in step S408, the controller 150 determines whether a forced precedence RIP function is set. If it is determined that the setting of the forced precedence RIP function (forced precedence RIP setting) is ON (YES in step S408), then in step S406, the controller 150 performs precedence RIP processing on the print data. If it is determined that the forced precedence RIP setting is OFF (NO in step S408), then in step S409, the controller 150 directly stores the received print data, without performing any processing operation thereon, in the HDD 164.

In the above-described way, such a series of operations is performed as the job reception processing.

[Precedence RIP Processing]

The server 105 performs precedence RIP processing in step S309. The precedence RIP processing is processing for performing RIP processing beforehand prior to reception of a transmission request for print data from the printing apparatus 101, 102, or 103. Performing RIP processing beforehand enables reducing a load on the RIP circuit 128 during printing and thus reducing the processing time of rendering. Therefore, this enables reducing a waiting time required from when the user issues a printing instruction at the printing apparatus 101, 102, or 103 until the user obtains a printed product.

Figure 6:
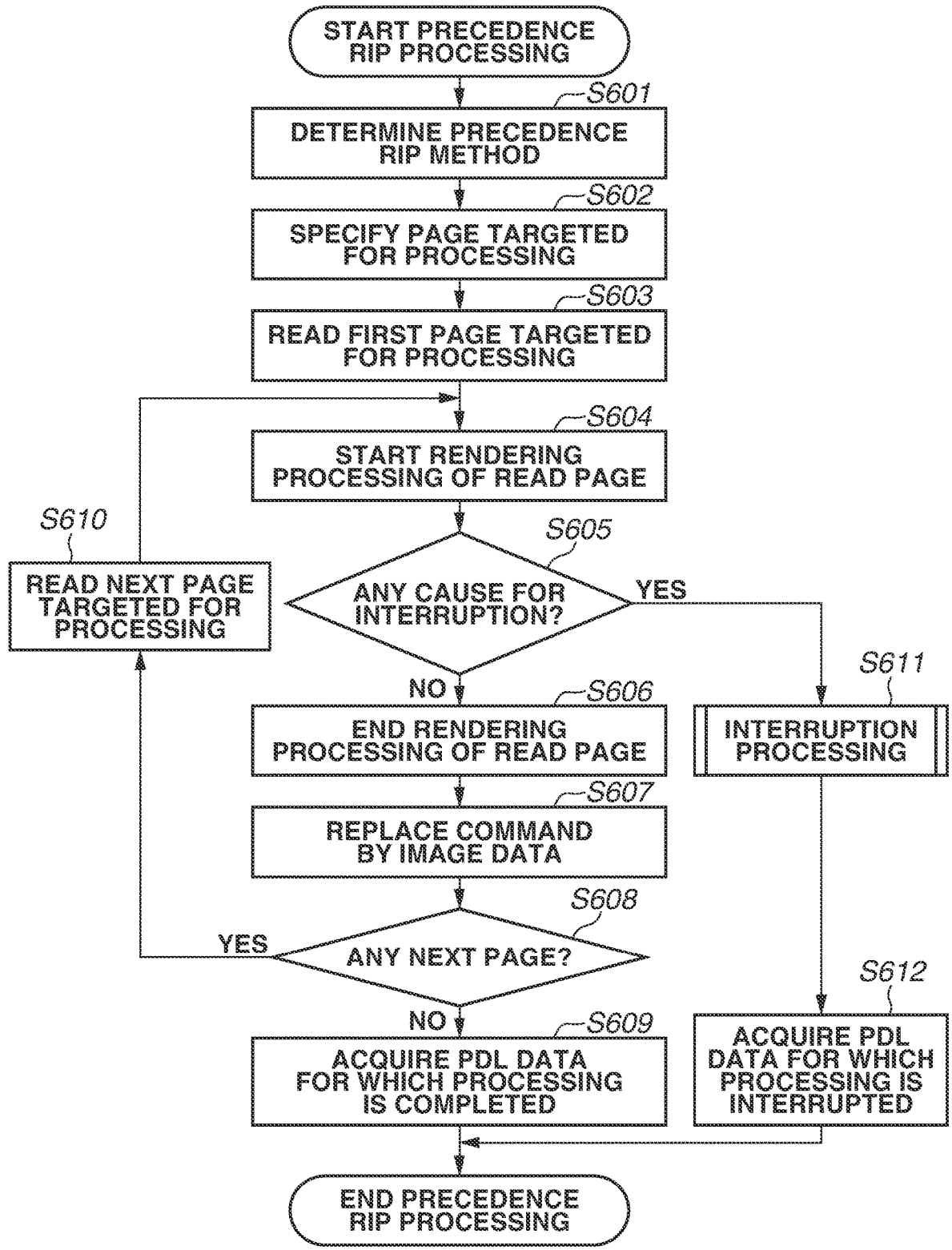
FIG. 6 is a flowchart of precedence raster image processor (RIP) processing.

The following describes the flow of precedence RIP processing in detail. FIG. 6 is a flowchart illustrating the precedence RIP processing.

Upon starting the precedence RIP processing, in step S601, the controller 150 determines a precedence RIP method. To be more specific, the controller 150 determines an image format (color/monochrome, output size, and resolution) used for replacement of pages. The determination of the image format is made based on the apparatus information. FIG. 10 illustrates an apparatus information database (DB) 1000 stored in the HDD 164.

The apparatus information DB 1000 includes an apparatus ID column 1001, an apparatus type column 1002, an address column 1003, a color/monochrome column 1004, an output size column 1005, and a resolution column 1006, an engine speed column 1007, a transfer speed column 1008, a status column 1009, and an RIP capability column 1010.

An apparatus ID, which is identification information about each apparatus, is stored in the apparatus ID column 1001. Type information about each apparatus is stored in the apparatus type column 1002. Address information about each apparatus is stored in the address column 1003. Color/monochrome compatibility information about each apparatus is stored in the color/monochrome column 1004. Output size compatibility information about each apparatus is stored in the output size column 1005. Resolution compatibility information about each apparatus is stored in the resolution column 1006. Engine speed information about each apparatus is stored in the engine speed column 1007. Transfer speed information about transfer between apparatuses is stored in the transfer speed column 1008. Status information about each apparatus is stored in the status column 1009. Highness or lowness information about the RIP capability of each apparatus is stored in the RIP capability column 1010.

In the present exemplary embodiment, a plurality of printing apparatuses is connected to the server 105. Therefore, print data stored in the server 105 can be printed by any one of the plurality of printing apparatuses. Compatible image formats vary with individual printing apparatuses, and, therefore, it is desirable to determine an image format based on apparatus information about an available printing apparatus. Here, a case is described in which it is determined that the printing apparatuses 101, 102, and 103 are available printing apparatuses. Furthermore, out of these printing apparatuses, only an apparatus in which status information of "online" is stored in the status column 1009 can be determined to be an available printing apparatus. Alternatively, instead of determining an image format in such a method, the image format of attached original data can be directly used.

In the color/monochrome column 1004, the format involving a large amount of information is a format of "color". In the output column 1005, the format involving the largest amount of information is a format of "A3". In the resolution column 1006, the format involving the largest amount of information is a format of "600×600 dpi". Therefore, the controller 150 determines that a combination of "color", "A3", and "600×600 dpi" is the image format to be used for precedence RIP processing. In this way, using an image format involving the largest amount of information enables preventing or reducing the deterioration of image quality for transmission of print data to any printing apparatus. Furthermore, in printing apparatuses compatible with image formats involving a small amount of information (for example, the printing apparatuses 101 and 103), conversion such as image reduction is performed.

Upon determining the image format used for precedence RIP processing, in step S602, the controller 150 specifies a page or pages targeted for rendering. In the present exemplary embodiment, a case is described in which all of the pages are targeted for rendering. However, only specific pages, such as pages which are time-consuming for rendering, can be determined to be targeted for rendering.

Upon determining pages targeted for processing, in step S603, the controller 150 reads a plurality of pages targeted for processing starting with the first page in order.

In step S604, the controller 150, which functions as the software RIP unit 213, analyzes a command in the read page and starts rendering on the read page.

In step S605, during rendering, the controller 150 monitors whether there is a cause for interruption of rendering. In the present exemplary embodiment, in a case where a request for transmission of print data that is in the process of being rendered is received from the printing apparatus 101, 102, or 103, the controller 150 determines that the cause for interruption is present. In other words, in a case where a request for transmission of print data is received during generation processing of an image, the controller 150 interrupts the generation processing.

If it is determined that there is no cause for interruption (NO in step S605), then in step S606, the controller 150 normally ends the rendering processing of the read page. Then, in step S607, the controller 150 replaces the command for the read page by a reading command for image data generated by rendering.

After that, if it is determined that there is a next page targeted for processing (YES in step S608), then in step S610, the controller 150 reads the next page and prepares for rendering thereof. If it is determined that there is no next page targeted for processing (NO in step S608), then in step S609, the controller 150 acquires PDL data for which precedence RIP processing is completed, and then ends the processing.

If, in step S605, it is determined that the cause for interruption is present (YES in step S605), then in step S611, the controller 150 performs interruption processing. Details of the interruption processing are described below. Then, in step S612, the controller 150 acquires PDL data for which precedence RIP processing is interrupted, and then ends the processing.

In the above-described way, such a series of operations is performed as the precedence RIP processing.

[Interruption Processing]

Figure 7A:
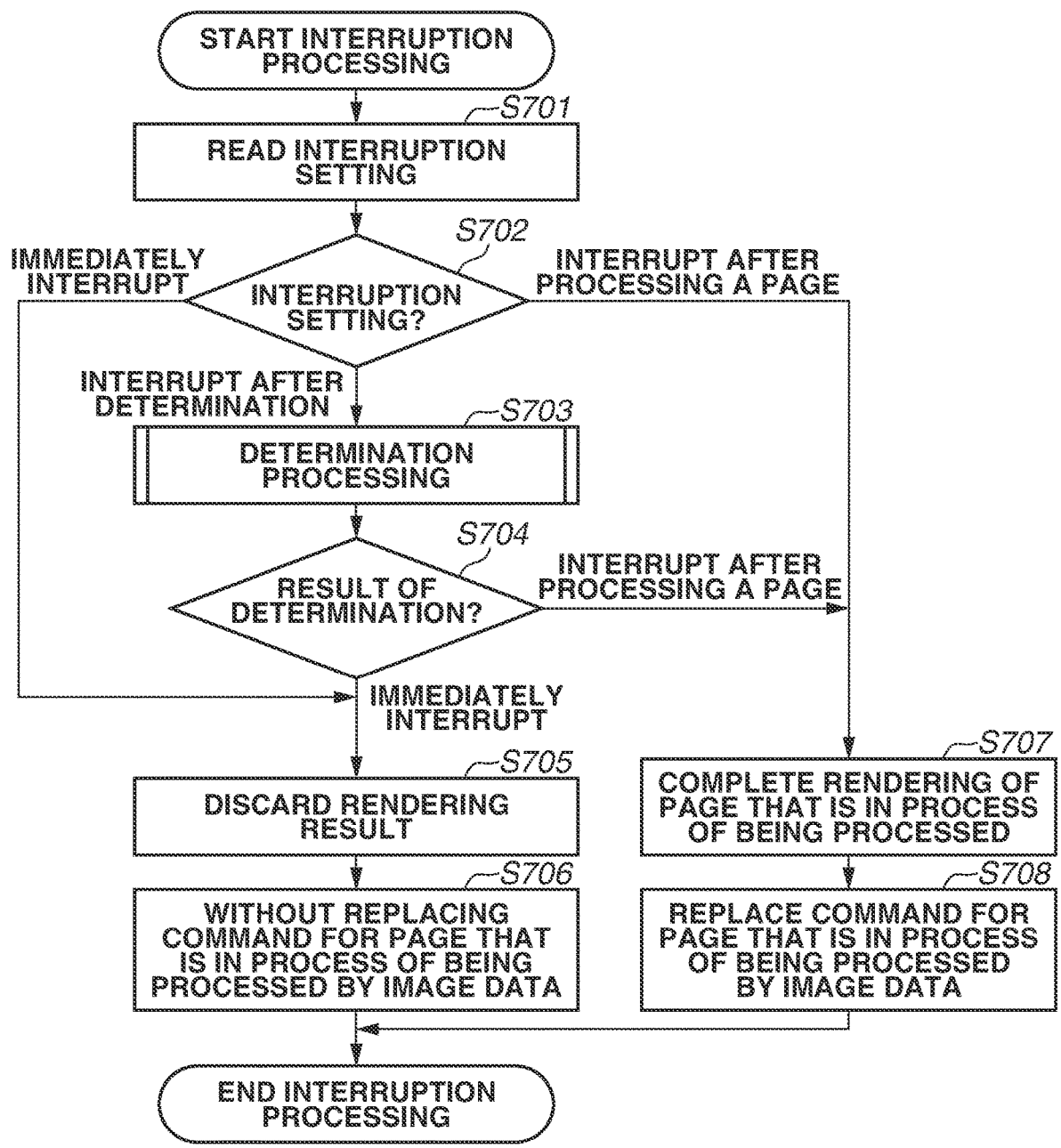
FIGS. 7A and 7B are a flowchart of interruption processing and a flowchart of determination processing, respectively.

The controller 150 performs interruption processing in step S611. The following describes the flow of interruption processing in detail. FIG. 7A is a flowchart illustrating the interruption processing.

In the interruption processing, in step S701, the controller 150 reads a setting value of interruption setting to determine an interruption method of the precedence RIP processing. The setting value includes values respectively indicating "immediately interrupt", "interrupt after processing a page", and "interrupt after determination". In the present exemplary embodiment, the setting value of interruption setting is assumed to be previously determined by the administrator user.

If it is determined that the read setting value indicates "immediately interrupt" (IMMEDIATELY INTERRUPT in step S702), the controller 150 advances the processing to step S705. If it is determined that the read setting value indicates "interrupt after processing a page" (INTERRUPT AFTER PROCESSING A PAGE in step S702), the controller 150 advances the processing to step S707.

If it is determined that the read setting value indicates "interrupt after determination" (INTERRUPT AFTER DETERMINATION in step S702), then in step S703, the controller 150 performs determination processing. Details of the determination processing are described below. If, in step S704, a result of the determination is "immediately interrupt" (IMMEDIATELY INTERRUPT in step S704), the controller 150 advances the processing to step S705. If the result of the determination is "interrupt after processing a page" (INTERRUPT AFTER PROCESSING A PAGE in step S704), the controller 150 advances the processing to step S707.

In step S705, the controller 150 discards a rendering result of a page that is in the process of being processed. Then, in step S706, the controller 150 ends the interruption processing without replacing a page command that is in the process of being processed by image data.

In step S707, the controller 150 waits until rendering of a page that is in the process of being processed is completed. When rendering of the page is completed, in step S708, the controller 150 replaces a command for the targeted page by image data obtained by rendering, and then ends the interruption processing.

[Determination Processing]

Figure 7B:
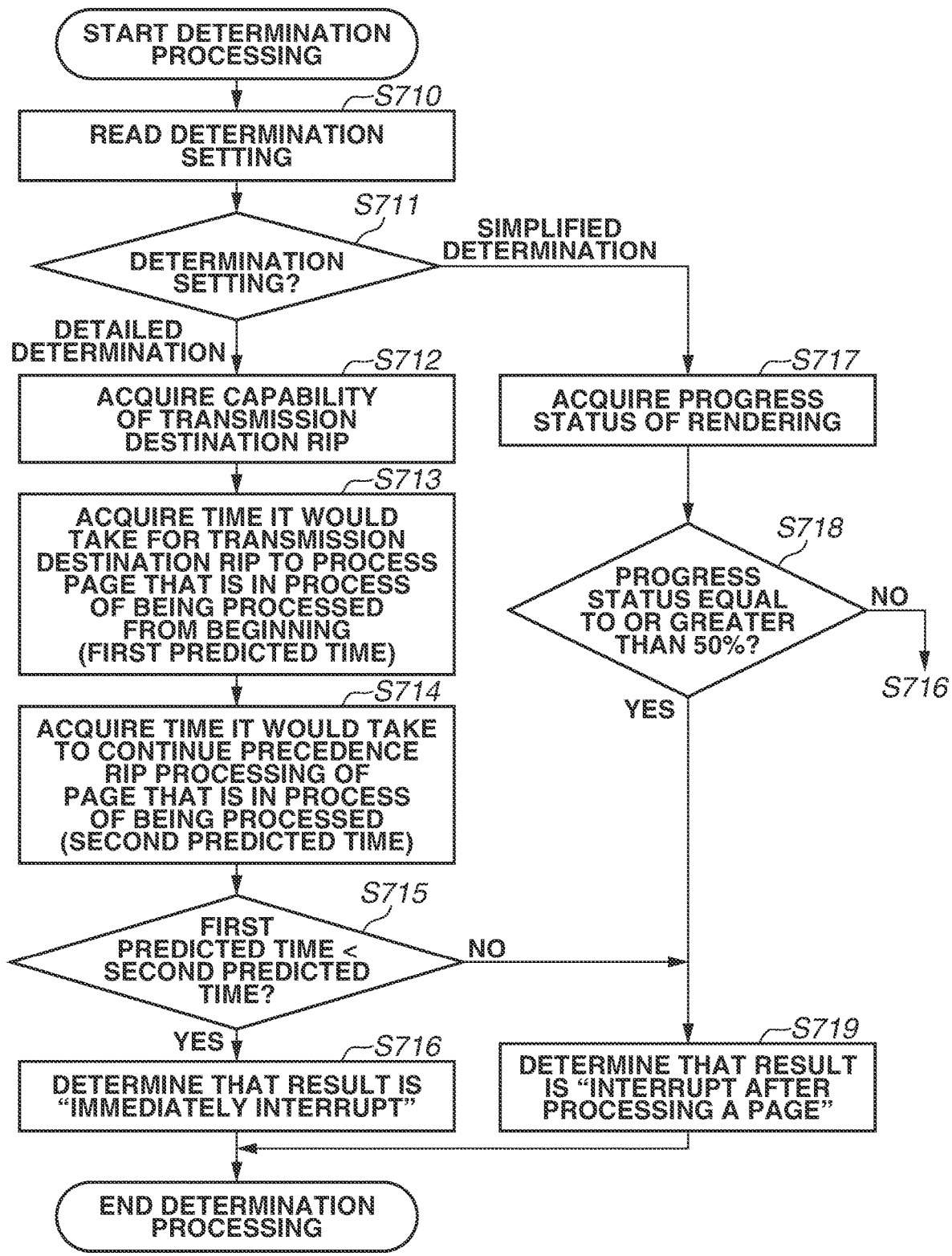

The controller 150 performs determination processing in step S703. The following describes the flow of determination processing in detail. FIG. 7B is a flowchart illustrating the determination processing.

In the determination processing, in step S710, the controller 150 reads a setting value of determination setting to determine a determination method of the interruption processing. The setting value includes values respectively indicating "detailed determination" and "simplified determination". In the present exemplary embodiment, the setting value of determination setting is assumed to be previously determined by the administrator user.

If it is determined that the read setting value indicates "detailed determination" (DETAILED DETERMINATION in step S711), the controller 150 advances the processing from step S711 to step S712. If it is determined that the read setting value indicates "simplified determination" (SIMPLIFIED DETERMINATION in step S711), the controller 150 advances the processing from step S711 to step S717.

In step S712, the controller 150 acquires a capability of the RIP circuit 128 included in a printing apparatus serving as a print data transmission destination. Then, in step S713, the controller 150 acquires a first predicted time. Here, the first predicted time is a predicted processing time it would take for the RIP circuit 128 to perform rendering up to a page that is currently being processed from the beginning.

Moreover, in step S714, the controller 150 acquires a second predicted time. The second predicted time is a predicted processing time it would take for the software RIP unit 213 to continue rendering on a page that is currently being processed.

Upon acquisition of the first predicted time and the second predicted time, in step S715, the controller 150 makes a comparison between the first predicted time and the second predicted time.

If the first predicted time is less than the second predicted time (YES in step S715), then in step S716, the controller 150 determines that the result of determination is "immediately interrupt", and then ends the processing. If the first predicted time is equal to or greater than the second predicted time (NO in step S715), then in step S719, the controller 150 determines that the result of determination is "interrupt after processing a page", and then ends the processing.

In step S717, the controller 150 acquires a progress status of rendering. The progress status of rendering is the proportion of the current page processing elapsed time to a predicted time required for processing of the page. For example, when a page the predicted processing time of which is one minute has been processed for 30 seconds, the progress status is 50%. Furthermore, the progress status can be calculated by using another method. For example, the progress status can be calculated based on the proportion of the number of objects that have been processed to the total number of objects to be used for rendering of the page. For example, the progress status can be calculated based on the proportion of the data size of objects that have been processed to the total data size of objects to be used for rendering of the page.

Upon calculating the progress status, in step S718, the controller 150 compares the progress status with a threshold value. The threshold value is assumed to be previously set by the administrator user. In the present exemplary embodiment, the threshold value is set to 50%.

If the progress status is equal to or greater than 50% (YES in step S718), then in step S719, the controller 150 determines that the result of determination is "interrupt after processing a page", and then ends the processing.

If the progress status is less than 50% (NO in step S718), then in step S716, the controller 150 determines that the result of determination is "immediately interrupt", and then ends the processing.

[PDL Rewriting Processing]

Figure 9A:
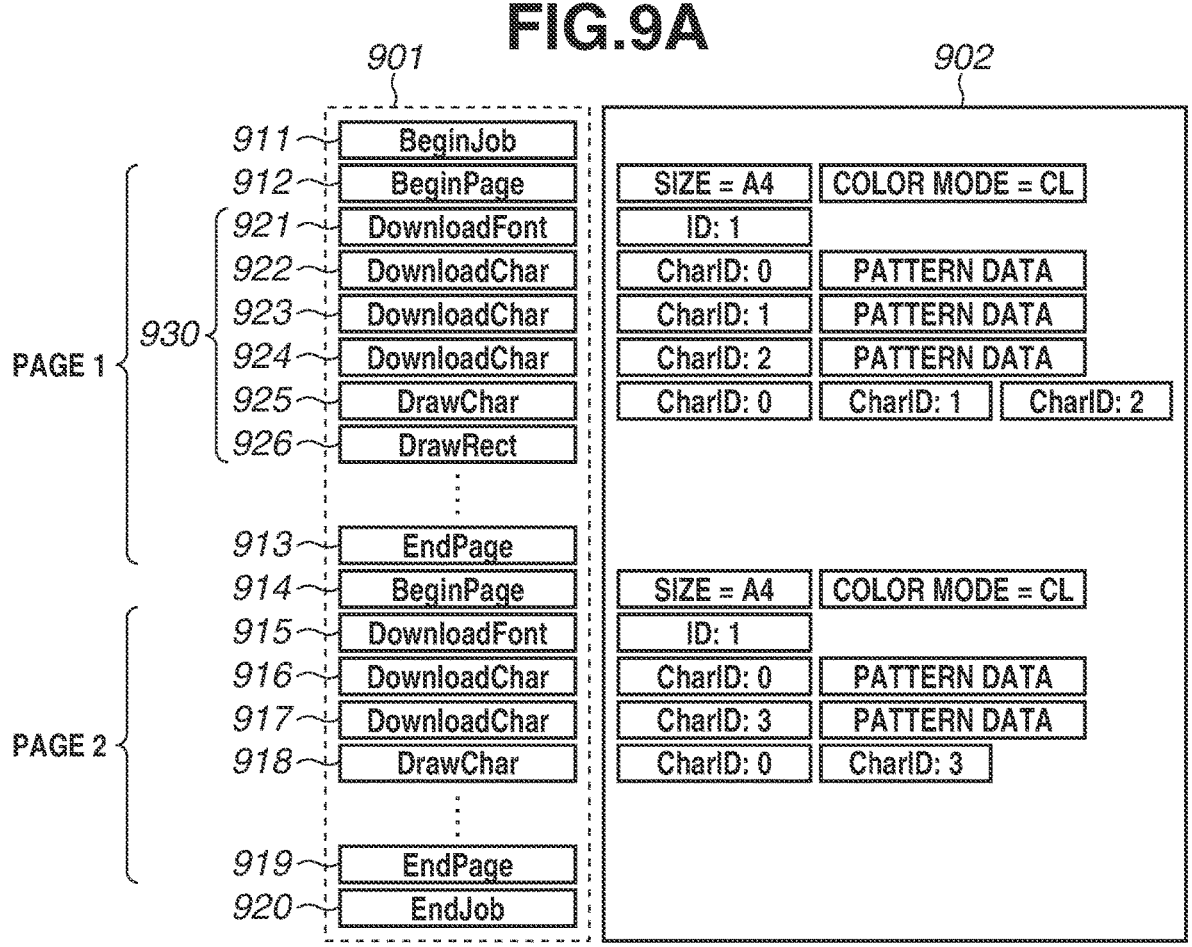
FIGS. 9A and 9B illustrate a page-description language (PDL) data structure taken before the precedence RIP processing and a PDL structure taken after the precedence RIP processing, respectively.
Figure 9B:
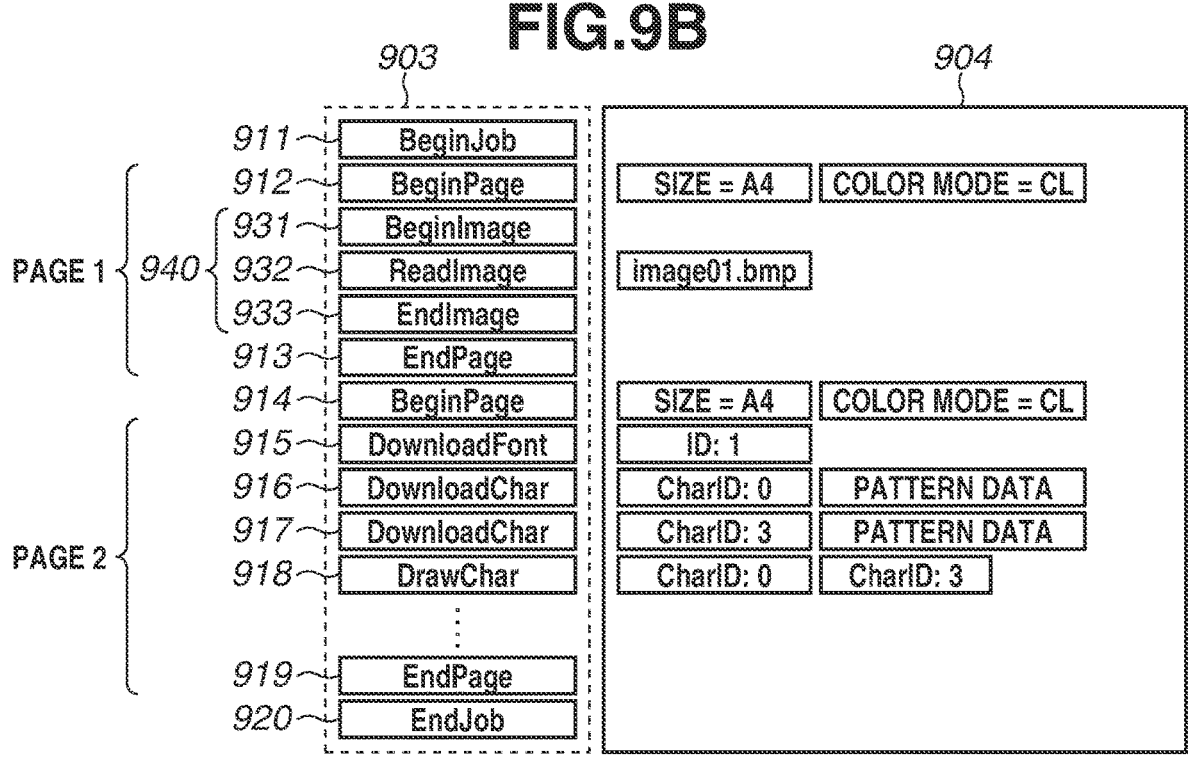

In the present exemplary embodiment, rewriting of PDL data is performed using image data generated by the precedence RIP processing. Rewriting of PDL data (replacement of a command) illustrated in step S607 is described in detail. FIG. 9A illustrates a PDL data structure obtained before the precedence RIP processing. FIG. 9B illustrates a PDL data structure obtained after the precedence RIP processing.

PDL data is configured with commands and parameters that are appended to the respective commands. The commands are previously defined based on the language specification of PDL. Each parameter specifies the instruction content of a command and the details of data. Each parameter includes, for example, an item essential for the associated command and an item the initial value of which is predetermined and which can be appended as needed.

As illustrated in FIG. 9A, PDL data obtained before the precedence RIP processing is configured with a command group 901 and a parameter group 902. As illustrated in FIG. 9B, PDL data obtained after the precedence RIP processing is configured with a command group 903 and a parameter group 904.

A command "BeginJob" 911 indicates beginning of a job, and a command "EndJob" 920 indicates ending of the job. A command "BeginPage" 912 indicates beginning of page 1, and a command "EndPage" 913 indicates ending of page 1. A command "BeginPage" 914 indicates beginning of page 2, and a command "EndPage" 919 indicates ending of page 2. Thus, this PDL data has a hierarchical structure of PDL commands for two pages sandwiched between the command "BeginJob" 911 and the command "EndJob" 920. Each page structure contains a command group to be used for various drawing processing operations.

Page 1 of the command group 901 contains, for example, a command "DownloadFont" 921, commands "DownloadChar" 922 to 924, a command "DrawChar" 925, and a command "DrawRect" 926. Page 2 of the command group 901 contains, for example, a command "DownloadFont" 915, a command "DownloadChar" 916, a command "DownloadChar" 917, and a command "DrawChar" 918.

Page 1 of the command group 903 contains a command "BeginImage" 931, a command "ReadImage" 932, and a command "EndImage" 933.

Page 2 of the command group 903 contains, for example, a command "DownloadFont" 915, a command "DownloadChar" 916, a command "DownloadChar" 917, and a command "DrawChar" 918, as with page 2 of the command group 901.

The command "DownloadFont" is a command used to designate a font to be used for printing. The command "DownloadFont" has, as parameters, an item "ID" for designating a font and font data serving as common data.

The command "DownloadChar" is a command used to register font data for each character. The command "DownloadChar" has, as parameters, an item "charID" for specifying a character and pattern data expressing a glyph shape. Such a command group used to register or delete font data is referred to as a "resource control command".

The command "DrawChar" is a command used to draw a registered character pattern. The command "DrawChar" has an item "CharID" as a parameter.

The command "DrawRect" is a command used to express a graphic such as a rectangle.

The command "BeginImage" 931 indicates beginning of an image, and the command "EndImage" 933 indicates ending of the image. The command "ReadImage" 932 is a command used to read data "image01.bmp". The data "image01.bmp" is image data generated based on a drawing command section 930 of page 1. One image can be expressed by a set of three commands "BeginImage" 931, "ReadImage" 932, and "EndImage" 933. Thus, image data can be appended to the inside of the PDL data in a command format.

Comparing FIG. 9A with FIG. 9B makes it understandable that the drawing command section 930 of page 1 is replaced by an image command section 940. In this way, decreasing the number of commands required to be analyzed enables reducing a load of analytical processing required to perform rendering processing. Moreover, since the data "image01.bmp" is image data subjected to rendering, a load of rendering during printing can be reduced.

On the other hand, rewriting of PDL data is not performed with respect to page 2. Viewing FIG. 9A and FIG. 9B makes it understandable that there is no difference between respective corresponding commands in page 2. In this way, replacing a drawing command by an image command in a specific page enables completing RIP processing of some pages (a second number of pages) among all of the pages (a first number of pages) beforehand. Furthermore, print settings, such as size and color mode, serving as parameters designated by the command "BeginPage" 912 are retained. Such print settings can be changed based on a user's instruction at timing of actual printing. In this way, even when commands for some pages are replaced by image commands, the data format remains an original data format (PDL). Therefore, the RIP circuit 128 of the printing apparatus 101 is able to perform finishing RIP processing of PDL data subjected to replacement without having any special configuration.

Furthermore, PDL data which is used in the above description is data "whose resource inheritance level is a page". The data "whose resource inheritance level is a page" is data having a format in which a resource registered by the resource control command is able to be used only in the page. Therefore, parameters "ID:1" and "CharID:0" are registered for page 1, and parameters "ID:1" and "CharID:0" are re-registered for page 2.

On the other hand, there is data "whose resource inheritance level is a job". The data "whose resource inheritance level is a job" is data having a format in which a resource registered by the resource control command is able to be used over a plurality of pages in the job. Therefore, registering parameters "ID:1" and "CharID:0" for page 1 enables using parameters "ID:1" and "CharID:0" for page 2 without performing re-registration. Thus, the command "DownloadFont" 915 and the command "DownloadChar" 916 become unrequired. However, if the command "DownloadFont" 921 and the command "DownloadChar" 922 are deleted in page 1, the command "DrawChar" 918 becomes unable to be normally executed in page 2. Therefore, in rewriting of data "whose resource inheritance level is a job", even in the case of replacing the entire page by image data, it is desirable that a resource control command required for another page be left without being deleted. However, it is difficult to specify a resource control command required for another page, and, therefore, with regard to data "whose resource inheritance level is a job", the entire resource control command can be retained. On the other hand, with regard to data "whose resource inheritance level is a page", the resource control command can be deleted.

[Instruction Acceptance Processing]

Figure 5:
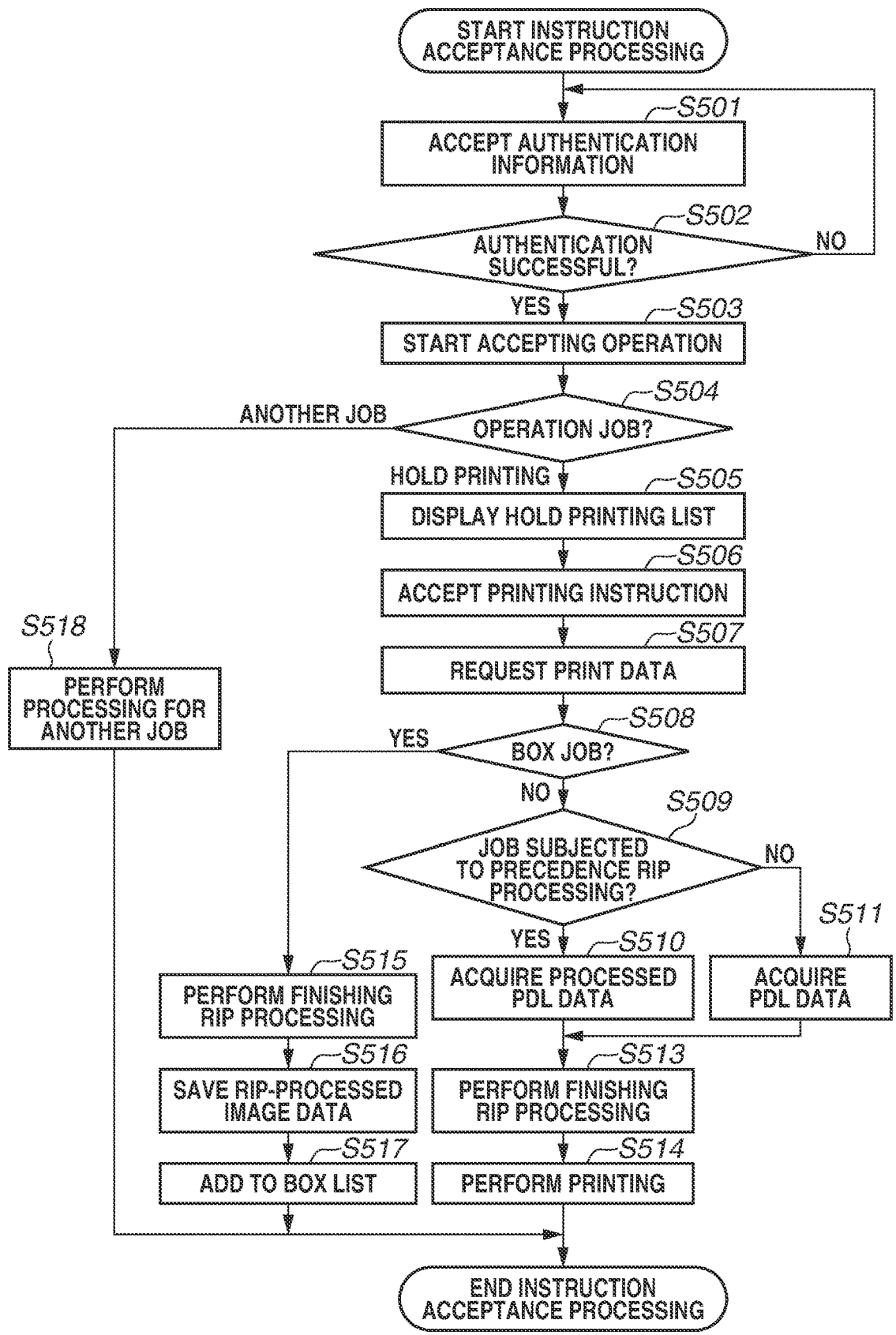
FIG. 5 is a flowchart of instruction acceptance processing.

The printing apparatus 101 performs instruction acceptance processing in response to the user's login in step S310. The following describes the instruction acceptance processing in detail. FIG. 5 is a flowchart illustrating the instruction acceptance processing.

When any input key of the operation panel 113 is pressed by the user, in step S501, the controller 110 causes the operation panel 113 to display a login screen (not illustrated) to start accepting authentication information. When authentication information is input from the card reader 112 or an input key during displaying of the login screen, in step S502, the controller 110 makes a determination of authentication. If user authentication is failed (NO in step S502), then in step S501, the controller 110 continues to accept authentication information. If user authentication is successful (YES in step S502), then in step S503, the controller 110 reflects information about the authenticated user in each application. For example, the controller 110 acquires bibliographic information associated with the logged-in user based on the user information from the server 105. Then, in step S504, the controller 110 allows the user to perform an operation on various functions (applications).

If an operation for another function is designated by the user (ANOTHER JOB in step S504), then in step S518, the controller 110 performs processing for another job, and then ends the processing.

If an operation for the hold printing function is designated by the user (HOLD PRINTING in step S504), then in step S505, the controller 110 causes the operation panel 113 to display the hold printing screen 1120. The displayed hold printing screen 1120 includes a list of pieces of print data held in the server 105 (identification information). In the present exemplary embodiment, only print jobs associated with the logged-in user among pieces of print data held in the server 105 are displayed in the list 1121. When a print job is selected and the printing instruction button 1122 is selected, in step S506, the controller 110 accepts inputting of a printing instruction. Then, in step S507, the controller 110 requests print data concerning the printing instruction from the server 105.

If the selected print job is a box job (a job for which save is designated by the printer driver) (YES in step S508), then in step S515, the controller 110 acquires print data and causes the RIP circuit 128 to perform finishing RIP processing thereon. In step S516, the controller 110 saves image data obtained by the RIP processing to the HDD 124. Then, in step S517, the controller 110 registers bibliographic information about the print data subjected to the finishing RIP processing with a box list.

If the selected print job is not a box job (NO in step S508) and is a job subjected to the precedence RIP processing (YES in step S509), then in step S510, the controller 110 acquires the processed PDL data. Then, in step S513, the controller 110 performs finishing RIP processing of the PDL data using the RIP circuit 128.

If the selected print job is not a box job (NO in step S508) and is a job not subjected to precedence RIP processing (NO in step S509), then in step S511, the controller 110 acquires unprocessed PDL data. Upon acquisition of the PDL data, in step S513, the controller 110 transmits the PDL data to the RIP circuit 128 to perform finishing RIP processing thereon. In step S514, the controller 110, which has acquired image data RIP-processed by the finishing RIP processing, causes the image processing circuit 129 to perform image correction on the image data and then transmits the image data to the printing mechanism 111 to cause the printing mechanism 111 to perform printing.

In the above-described way, such a series of operations is performed as the instruction reception processing.

[Advantageous Effect]

According to the present exemplary embodiment, the server 105 is able to implement precedence RIP processing. In other words, the server 105 is able to perform RIP processing on print data before the user issues a printing instruction. Therefore, a waiting time for the user after issuing the printing instruction can be reduced.

According to the present exemplary embodiment, the server 105 is able to interrupt precedence RIP processing and to transmit a halfway result thereof to a printer serving as a transmission destination. Therefore, a waiting time for the user after issuing the printing instruction can be reduced.

According to the present exemplary embodiment, the user is allowed to specify, via a driver in the PC, whether to perform precedence RIP processing. Therefore, precedence RIP processing can be appropriately performed on a job required to be subjected to precedence RIP processing.

According to the present exemplary embodiment, the user is allowed to change, via setting of the printing apparatus, whether to perform precedence RIP processing. Therefore, setting does not need to be performed for each job at the printer driver, so that the present exemplary embodiment is excellent in usability.

In the first exemplary embodiment, a printing system has been described in which print data transmitted from a PC is temporarily accumulated in a server and the print data is downloaded from the server to a printer to perform printing. In a second exemplary embodiment, a printing system is described in which print data transmitted from a PC is processed by a printer having a server function.

[Printing System]

Figure 12A:
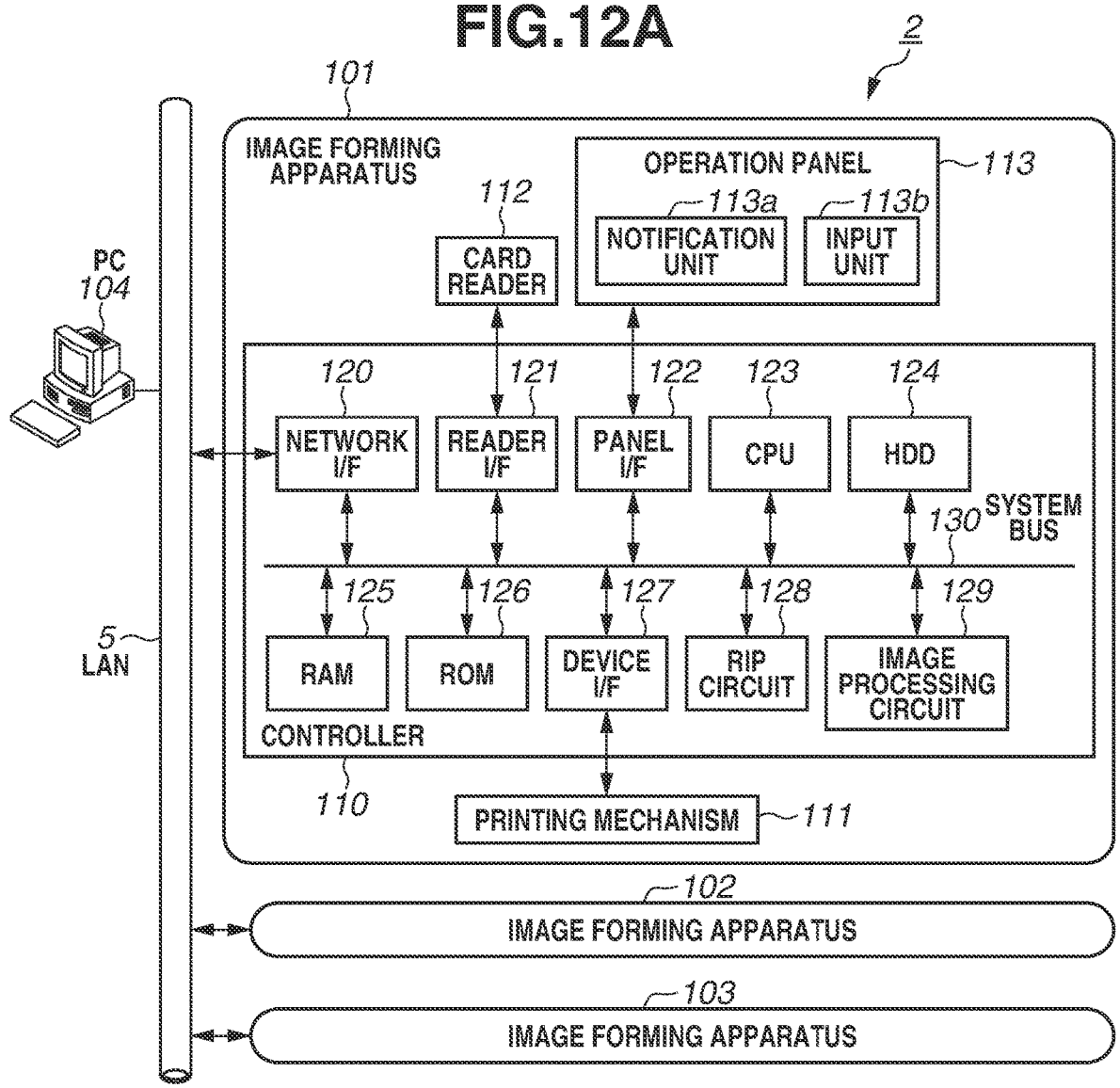
FIGS. 12A and 12B are a diagram illustrating an image forming system according to a second exemplary embodiment and a block diagram illustrating a software configuration of an image forming apparatus according to the second exemplary embodiment, respectively.
Figure 12B:
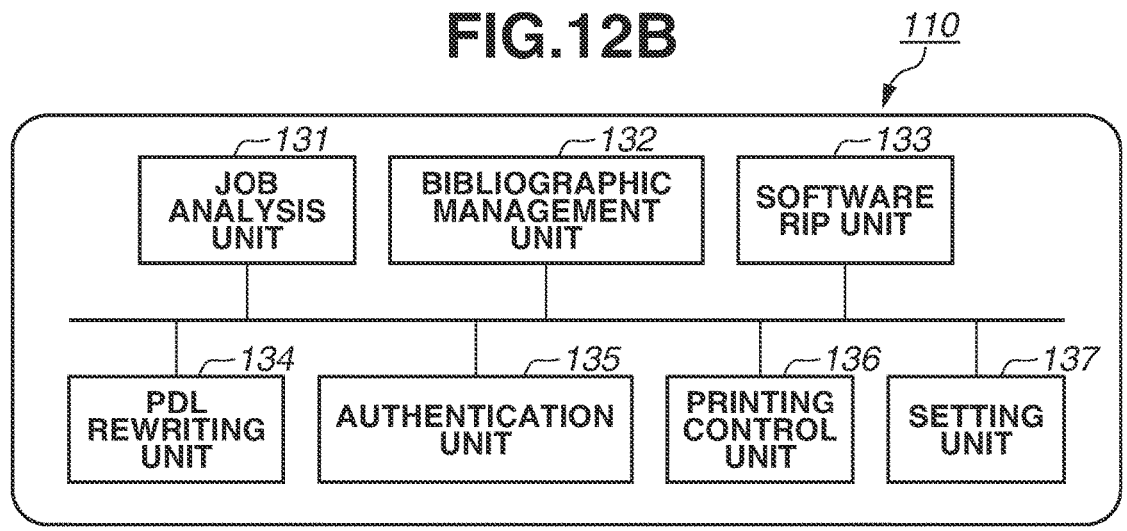

FIG. 12A illustrates a configuration of a printing system 2 according to the second exemplary embodiment. FIG. 12B illustrates a software configuration of a printing apparatus 101 in the second exemplary embodiment. The printing system 2 includes the printing apparatus 101, which has a server function, other printing apparatuses 102 and 103, and a PC (host computer) 104. Such apparatuses are interconnected via a local area network (LAN) 5, such as Ethernet, in such a way as to be able to communicate with each other. In the printing system 2, print data output from the PC 104 is accumulated in the printing apparatus 101 and then becomes able to be transmitted to another printing apparatus 102 or 103. After that, the print data is printed by the printing apparatus 101. Alternatively, the print data is transmitted to and printed by another printing apparatus 102 or 103.

[Server Software Configuration]

The controller 110 in the second exemplary embodiment functions as various functional units by executing various programs. To be more specific, various functions are implemented by the CPU 123 loading programs stored in the ROM 126 or the HDD 124 onto the RAM 125 and executing the programs. The controller 110 includes, as functional units, a job analysis unit 131, a bibliographic management unit 132, a software RIP unit 133, a PDL rewriting unit 134, an authentication unit 135, a printing control unit 136, and a setting unit 137.

The job analysis unit 131 has a function similar to that of the job analysis unit 211 or 221. The bibliographic management unit 132 has a function similar to that of the bibliographic management unit 212 or 222. The software RIP unit 133 has a function similar to that of the software RIP unit 213. The PDL rewriting unit 134 has a function similar to that of the PDL rewriting unit 214. The authentication unit 135 has a function similar to that of the authentication unit 215 or 223. The printing control unit 136 has a function similar to that of the printing control unit 224. The setting unit 137 has a function similar to that of the setting unit 216 or 225. Thus, the controller 110 in the second exemplary embodiment has both a function serving as the controller 150 in the first exemplary embodiment and a function serving as the controller 110 in the first exemplary embodiment.

Furthermore, a configuration in which a part or the whole of program processing for implementing various functional units is executed by an external apparatus connected to the printing apparatus 101, what is called a cloud configuration, can also be employed.

[Image Forming Sequence]

Figure 13:
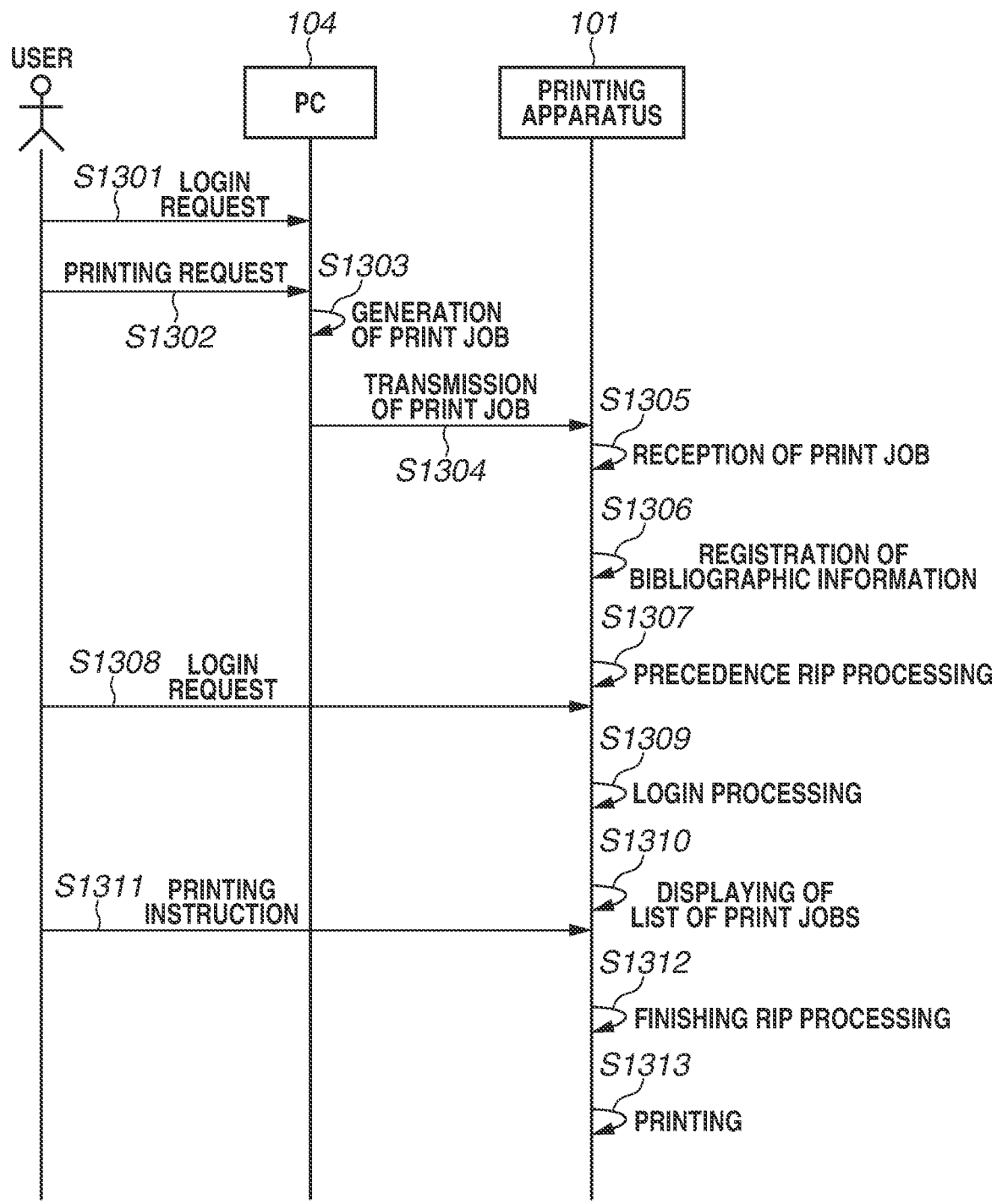
FIG. 13 illustrates a processing sequence of the image forming system according to the second exemplary embodiment.

An overall sequence in a case where printing is performed with use of the printing system 2 is described. FIG. 13 illustrates a processing sequence of the image forming system in the second exemplary embodiment.

To start the image forming sequence, first, in step S1301, the user makes a login request to the PC 104. In the login request, the user performs entry of user information, such as a user account name, and authentication information, such as a password. The PC 104 performs login processing for the user based on the information entered by the user. The user designates a document to be printed and issues an instruction to execute a printer driver. When the printer driver is activated, in step S1302, after designating a transmission destination of print data and a print setting, the user issues a printing instruction. In step S1303, the PC 104 generates print data based on, for example, the designated document, the print setting, and user information about the logged-in user. Upon generation of the print data, in step S1304, the PC 104 transmits the print data to the printing apparatus 101. In step S1305, upon receiving the print data, the printing apparatus 101 performs reception processing on the print data. In step S1306, the printing apparatus 101, which has received the print data, registers bibliographic information about the received print data with a bibliographic information database (DB). Upon completion of registration of the bibliographic information, in step S1307, the printing apparatus 101 performs precedence RIP processing on the received print data. After that, in step S1308, the user makes a login request to the printing apparatus 101. In step S1309, the printing apparatus 101 performs login processing in response to the login request. When login is successful, in step S1310, the printing apparatus 101 displays a list of jobs for the logged-in user. In step S1311, the user, who has checked the displayed print data list, selects print data to be printed and issues a printing instruction. In step S1312, the printing apparatus 101 performs finishing RIP processing on the print data subjected to the precedence RIP processing. Then, in step S1313, the printing apparatus 101 performs printing based on the generated image data.

[Job Reception Processing]

Figure 14:
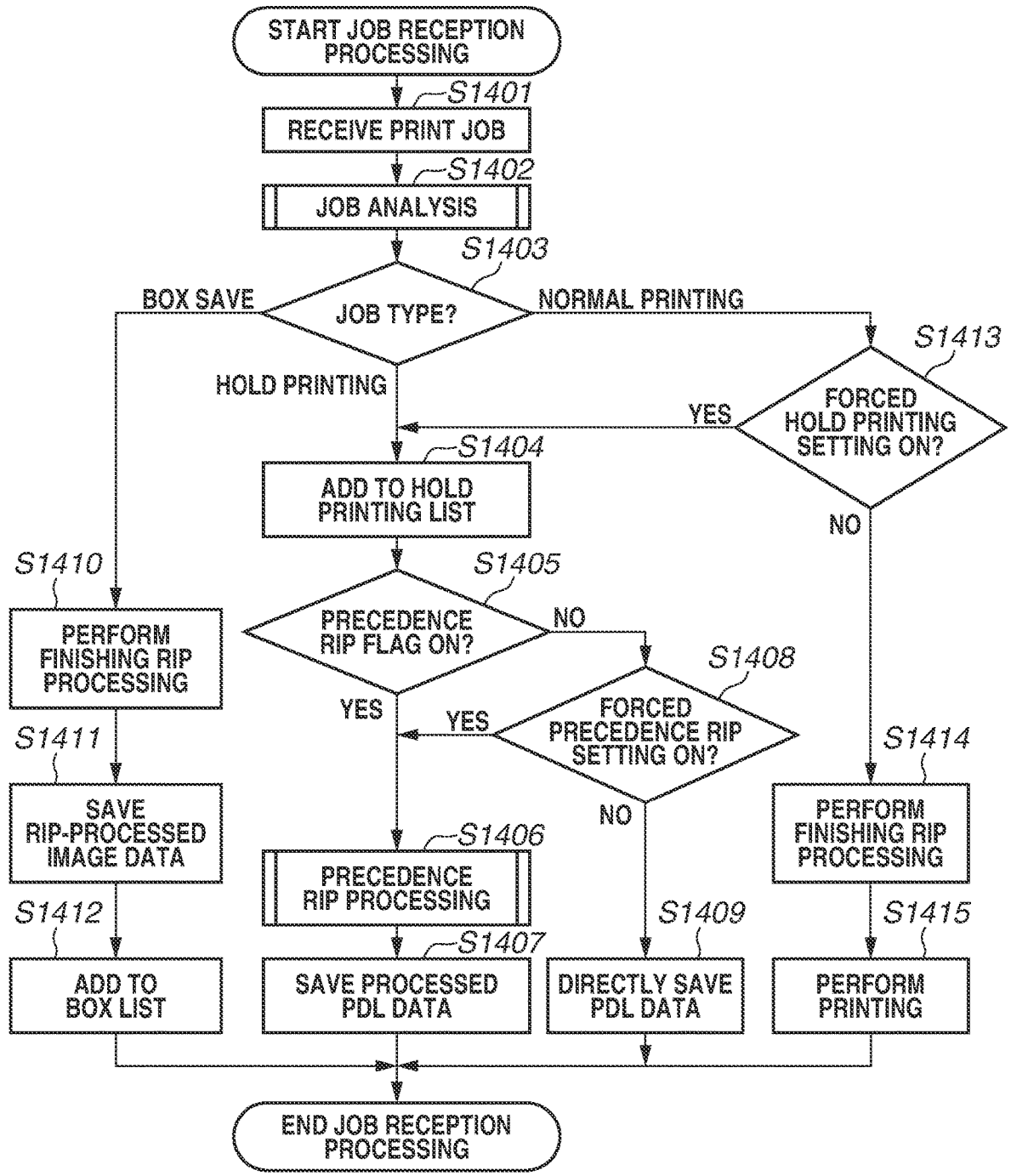
FIG. 14 is a flowchart illustrating job reception processing in the second exemplary embodiment.

The printing apparatus 101 performs job reception processing in response to reception of print data performed in step S1305. The following describes the job reception processing in detail. FIG. 14 is a flowchart illustrating the job reception processing.

In step S1401, when print data is transmitted via a network, such as the LAN 5, the controller 110 receives the print data via the network I/F 120. Upon receiving the print data, in step S1402, the controller 110 analysis the print data, which is of the PDL format, by using the job analysis unit 131. Upon acquiring type information about the print data based on the analysis, in step S1403, the controller 110 determines a job type of the print data.

If the received print data is a box save job (if save is designated as the output method) (BOX SAVE in step S1403), then in step S1410, the controller 110 performs finishing RIP processing using the RIP circuit 128 to generate image data. Then, in step S1411, the controller 110 saves the generated image data to the HDD 124. In step S1412, the controller 110, which functions as the bibliographic management unit 132, associates a document name, user information, an address of the saved image data, and a flag indicating box save with each other as a print job and registers the print job with the bibliographic information DB. A print job having a flag indicating box save is displayed in the box screen 1110 illustrated in FIG. 11A.

If the received print data is a hold printing job (if secure (hold printing) is designated as the output method) (HOLD PRINTING in step S1403), then in step S1404, the controller 110, which functions as the bibliographic management unit 132, registers job information with the bibliographic information DB. The job information includes, for example, a document name, user information, a destination to save print data, and a flag indicating hold printing. At this stage, the registered bibliographic information can be transmitted to another printing apparatus 102 or 103. A print job having a flag indicating hold printing is displayed in the hold printing screen 1120 illustrated in FIG. 11B. Therefore, at this stage, the user can issue a printing instruction.

Upon registration of the hold printing job with the bibliographic information DB, in step S1405, the controller 110 determines whether a precedence RIP flag appended to the print data is ON or OFF. If it is determined that the precedence RIP flag is ON (YES in step S1405), then in step S1406, the controller 110, which functions as the software RIP unit 133, performs precedence RIP processing on the print data. Details of the precedence RIP processing are similar to those in the first exemplary embodiment and are, therefore, omitted from description. In step S1407, the controller 110 stores the processed PDL data obtained as a result of the precedence RIP processing in the HDD 124.

If it is determined that the precedence RIP flag is OFF (NO in step S1405), then in step S1408, the controller 110 determines whether a forced precedence RIP function is set. If it is determined that the setting of the forced precedence RIP function (forced precedence RIP setting) is ON (YES in step S1408), then in step S1406, the controller 110 performs precedence RIP processing on the print data. If it is determined that the forced precedence RIP setting is OFF (NO in step S1408), then in step S1409, the controller 110 directly stores the received print data, without performing any processing operation thereon, in the HDD 124.

If the received print data is a normal printing job (if printing is designated as the output method) (NORMAL PRINTING in step S1403), then in step S1413, the controller 110 checks whether forced hold printing setting is ON. If it is determined that the forced hold printing setting is ON (YES in step S1413), then in step S1404, the controller 110 processes the received print data as a hold printing job. If it is determined that the forced hold printing setting is OFF (NO in step S1413), then in step S1414, the controller 110 performs finishing RIP processing on the print data using the RIP circuit 128. The controller 110 causes the image processing circuit 129 to correct image data generated by the finishing RIP processing. Then, in step S1415, the controller 110, which functions as the printing control unit 136, transmits the corrected image data to the printing mechanism 111 to cause the printing mechanism 111 to perform image formation, In the above-described way, such a series of operations is performed as the job reception processing.

[Instruction Acceptance Processing]

Figure 15:
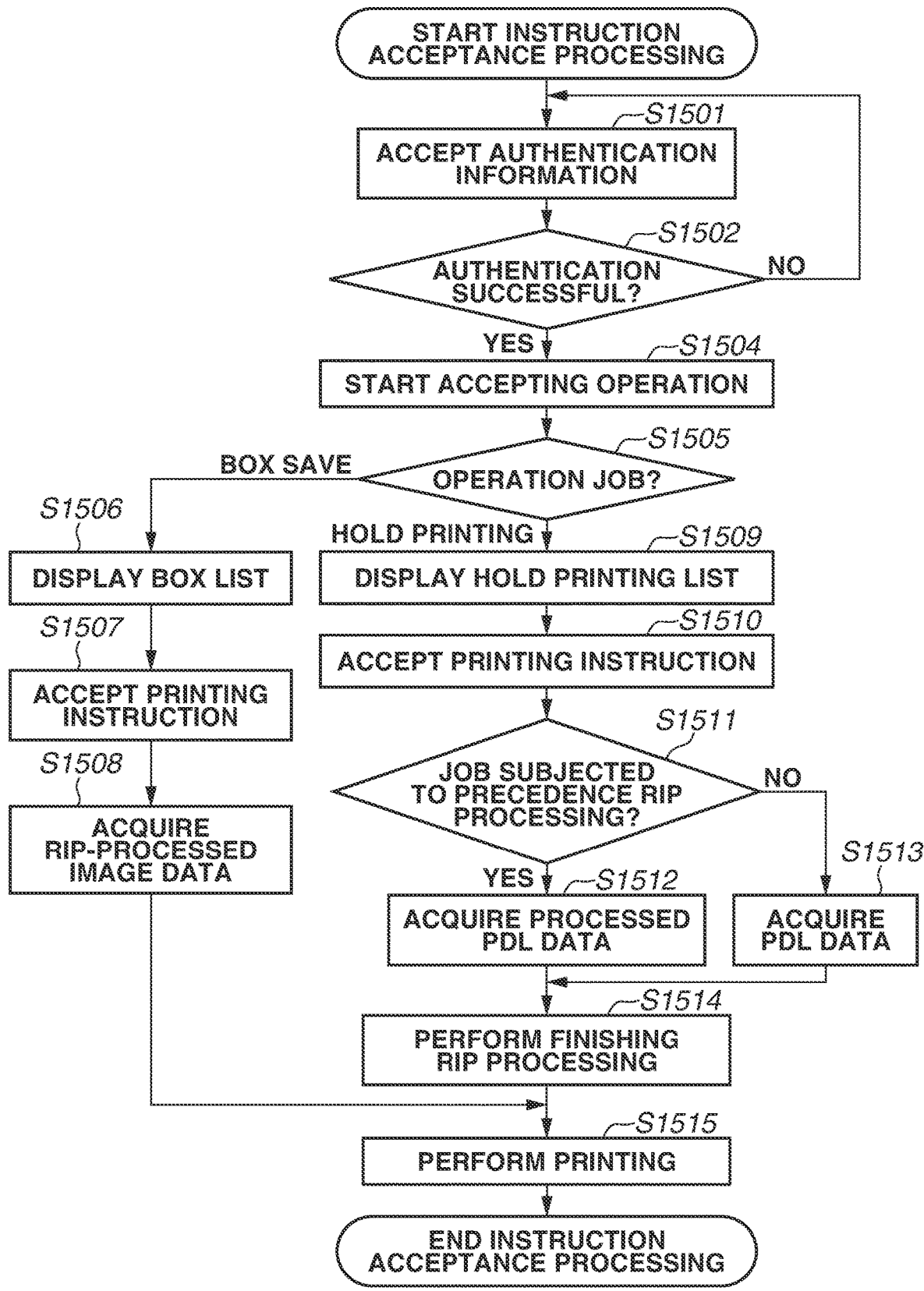
FIG. 15 is a flowchart illustrating instruction acceptance processing in the second exemplary embodiment.

The printing apparatus 101 performs instruction acceptance processing in response to the user's login in step S1309. The following describes the instruction acceptance processing in detail. FIG. 15 is a flowchart illustrating the instruction acceptance processing.

When any input key of the operation panel 113 is pressed by the user, in step S1501, the controller 110 causes the operation panel 113 to display a login screen (not illustrated) to start accepting authentication information. When authentication information is input from the card reader 112 or an input key during displaying of the login screen, in step S1502, the controller 110 makes a determination of authentication. If user authentication is failed (NO in step S1502), then in step S1501, the controller 110 continues to accept authentication information. If user authentication is successful (YES in step S1502), then in step S1504, the controller 110 reflects information about the authenticated user in each application. Then, in step S1505, the controller 110 allows the user to perform an operation on various functions (applications).

If an operation for the box function is designated by the user (BOX SAVE in step S1505), then in step S1506, the controller 110 causes the operation panel 113 to display the box screen 1110. A list 1111 of pieces of print data for which "save" is designated as the output method is displayed in the box screen 1110. When the user issues a printing instruction by selecting print data from among the list 1111 and pressing the printing instruction button 1112, in step S1507, the controller 110 accepts inputting of the printing instruction. Upon pressing of the printing instruction button 1112, in step S1508, the controller 110 reads out RIP-processed image data corresponding to the selected print data from the HDD 124, and, in step S1515, the controller 110 outputs the RIP-processed image data to the printing mechanism 111. Furthermore, besides a printing instruction, for example, a transmission instruction can be issued via the box screen 1110.

If an operation for the hold printing function is designated by the user (HOLD PRINTING in step S1505), then in step S1509, the controller 110 causes the operation panel 113 to display the hold printing screen 1120. A list 1121 of print jobs for which "hold printing" is designated as the output method or print jobs which are forcibly held by the setting of the printing apparatus 101 is displayed in the hold printing screen 1120. In the present exemplary embodiment, among pieces of print data held in the printing apparatus 101, only print jobs associated with the logged-in user are displayed in the list 1121. The list 1121 indicates not only a document name and entry time of each piece of print data but also a precedence processing state and a predicted processing time thereof. The user can issue a printing instruction by selecting a print job from among the list 1121 and pressing the printing instruction button 1122. Furthermore, the user can change the print setting by selecting the print setting button 1123 before issuing the printing instruction. Upon pressing of the printing instruction button 1122, in step S1510, the controller 110 accepts inputting of the printing instruction, and reflects the issuance of the printing instruction in each application. Then, if the selected print job is a job previously subjected to precedence RIP processing (YES in step S1511), then in step S1512, the controller 110 reads out the processed PDL data from the HDD 124. If the selected print job is not yet subjected to precedence RIP processing (NO in step S1511), then in step S1513, the controller 110 reads out PDL data left unprocessed since being stored from the HDD 124. In step S1514, the controller 110, which has read out the PDL data, transmits the PDL data to the RIP circuit 128 to perform finishing RIP processing thereon. In step S1515, the controller 110, which has acquired the RIP-processed image data in step S1508 or S1514, causes the image processing circuit 129 to perform image correction thereon and then transmits the processed print data to the printing mechanism 111, thus causing the printing mechanism 111 to perform printing.

In the above-described way, such a series of operations is performed as the instruction reception processing.

[Advantageous Effect]

According to the present exemplary embodiment, the printing apparatus 101 is able to implement precedence RIP processing. In other words, the printing apparatus 101 is able to perform RIP processing on print data before the user issues a printing instruction. Therefore, a waiting time for the user after issuing the printing instruction can be reduced.

According to the present exemplary embodiment, the printing apparatus 101 is able to interrupt precedence RIP processing and to transmit a halfway result thereof to a printer serving as a transmission destination. Therefore, a waiting time for the user after issuing the printing instruction can be reduced.

According to the present exemplary embodiment, the user is allowed to specify, via a driver in the PC, whether to perform precedence RIP processing. Therefore, precedence RIP processing can be appropriately performed on a job required to be subjected to precedence RIP processing.

According to the present exemplary embodiment, the user is allowed to change, via setting of the printing apparatus, whether to perform precedence RIP processing. Therefore, setting does not need to be performed for each job at the printer driver, so that the present exemplary embodiment is excellent in usability.

While, in the first exemplary embodiment, the precedence RIP method is determined based on a connected apparatus, a predetermined fixed precedence RIP method can also be employed. In that case, it is desirable that the fixed precedence RIP method use the format of large size, high image quality, and color.

In the first exemplary embodiment, a predicted time required for rendering processing is used to specify a page to be subjected to precedence RIP processing. However, the method for specifying a page to be subjected to precedence RIP processing is not limited only to this.

For example, a page to be subjected to precedence RIP processing can be specified based on the data size per page of PDL data. More specifically, such a configuration can be employed that a page the data size of which is equal to or less than a predetermined value (for example, 50 megabytes (MB)) is not to be subjected to precedence RIP processing and a page the data size of which is greater than the predetermined value (for example, 50 MB) is to be subjected to precedence RIP processing.

Furthermore, a page to be subjected to precedence RIP processing can be specified based on the number of commands per page of PDL data. More specifically, such a configuration can be employed that a page the number of commands of which is equal to or less than a predetermined value (for example, 10,000 commands) is not to be subjected to precedence RIP processing and a page the number of commands of which is greater than the predetermined value (for example, 10,000 commands) is to be subjected to precedence RIP processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-010745 filed Jan. 24, 2017, which is hereby incorporated by reference herein in its entirety.

What is claimed is:

1. An image forming apparatus comprising:
a printing device;
a raster image processor;
at least one memory that stores a set of instructions; and
at least one general purpose processor that executes the instructions to:
interpret, according to receiving PDL data, the received PDL data, using a resource of the at least one general purpose processor, and generate raster image data on a page basis, wherein the raster image data generated on the page basis using the resource of the at least one general purpose processor is to be stored in a storage region of the at least one memory;
interrupt, according to receiving a user operation to start printing the received PDL data while processing to generate raster image data corresponding to the received PDL data is being executed, the raster image data generation using the resource of the at least one general purpose processor; and
control the raster image processor to generate raster image data corresponding to a page not generated using the resource of the general purpose processor according to receiving the user operation to start printing the received PDL data, based on the received PDL data,
wherein in a case where the user operation to start printing the received PDL data is received while the processing to generate raster image data corresponding to the received PDL data is being executed and in a state that raster image data of at least one page is generated in the storage region, the printing device prints an image based on the raster image data of the at least one page generated by the at least one general purpose processor and raster image data of other pages generated by the raster image processor.

2. The image forming apparatus according to claim 1, wherein the instructions stored in the at least one memory further comprises instructions to start the raster image data generation using the resource of the general purpose processor if an image generation flag is set in a received print job including the PDL data.

3. The image forming apparatus according to claim 1, wherein the instructions stored in the at least one memory further comprises instructions to start the raster image data generation using the general purpose processor if an image generation setting is ON.

4. The image forming apparatus according to claim 1, wherein in a case where the raster image data generation using the resource of the general purpose processor is to be interrupted, the PDL data interpretation using the resource of the at least one general purpose processor is interrupted at timing of completing generation of raster image data of one page being generated at timing of receiving the user operation to start printing the received PDL data.

5. The image forming apparatus according to claim 1, wherein in a case where the raster image data generation using the resource of the general purpose processor is to be interrupted, raster image data being generated and corresponding to a page being generated at the timing of receiving the user operation to start printing the received PDL data is discarded and the PDL data interpretation using the resource of the at least one general purpose processor is interrupted.

6. A control method for an image forming apparatus having a raster image processor and at least one general purpose processor, the control method comprising:
   interpreting, according to receiving PDL data, the received PDL data, using a resource of the at least one general purpose processor, and generating raster image data on a page basis, wherein the raster image data generated on the page basis using the resource of the at least one general purpose processor is to be stored in a storage region of the image forming apparatus;
   interrupting, according to receiving a user operation to start printing the received PDL data while processing to generate raster image data corresponding to the received PDL data is being executed, the raster image data generation using the resource of the at least one general purpose processor; and
   controlling the raster image processor to generate raster image data corresponding to a page not generated using the resource of the general purpose processor according to receiving the user operation to start printing the received PDL data, based on the received PDL data,
   wherein in a case where the user operation to start printing the received PDL data is received while the processing to generate raster image data corresponding to the received PDL data is being executed and in a state that raster image data of at least one page is generated in the storage region, an image is printed based on the raster image data of the at least one page generated by the at least one general purpose processor and raster image data of other pages generated by the raster image processor.

7. The control method according to claim 6, further comprising starting the raster image data generation using the resource of the general purpose processor if an image generation flag is set in a received print job including the PDL data.

8. The control method according to claim 6, further comprising starting the raster image data generation using the general purpose processor if an image generation setting is ON.

9. The control method according to claim 6, wherein in a case where the raster image data generation using the resource of the general purpose processor is to be interrupted, the PDL data interpretation using the resource of the at least one general purpose processor is interrupted at timing of completing generation of raster image data of one page being generated at timing of receiving the user operation to start printing the received PDL data.

10. The control method according to claim 6, wherein in a case where the raster image data generation using the resource of the general purpose processor is to be interrupted, raster image data being generated and corresponding to a page being generated at the timing of receiving the user operation to start printing the received PDL data is discarded and the PDL data interpretation using the resource of the at least one general purpose processor is interrupted.

11. The image forming apparatus according to claim 1, wherein the at least one general purpose processor includes a Central Processing Unit, and the raster image processor is an Application Specific Integrated Processor.

12. The image forming apparatus according to claim 1, wherein the instructions stored in the at least one memory further comprises instructions to control, in a case where a user operation to start printing PDL data which is not interpreted by the at least one general purpose processor is received, the raster image processor to generate raster image data of all pages based on the PDL data.

13. The image forming apparatus according to claim 1, wherein in a case where a user operation to start printing PDL data corresponding to raster image data of all pages having been generated is received by the at least one general purpose processor, the printing device prints an image based on the raster image data of all the pages corresponding to the PDL data.

* * * * *